US012659204B2

(12) United States Patent
He et al.

(10) Patent No.: US 12,659,204 B2
(45) Date of Patent: Jun. 16, 2026

(54) SYSTEM INFORMATION SCHEDULING WITH MULTI-SLOTS PDCCH MONITORING OPERATION IN WIRELESS COMMUNICATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 681 days.

(21) Appl. No.: 17/921,334

(22) PCT Filed: Nov. 4, 2021

(86) PCT No.: PCT/CN2021/128739
§ 371 (c)(1),
(2) Date: Oct. 25, 2022

(87) PCT Pub. No.: WO2023/077363
PCT Pub. Date: May 11, 2023

(65) Prior Publication Data
US 2024/0388482 A1 Nov. 21, 2024

(51) Int. Cl.
*H04L 27/26* (2006.01)
*H04W 72/0446* (2023.01)
*H04W 72/23* (2023.01)

(52) U.S. Cl.
CPC ... *H04L 27/26025* (2021.01); *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2021/0235426 A1 | 7/2021 | Xia et al. | |
| 2021/0266909 A1 | 8/2021 | Lin et al. | |

(Continued)

FOREIGN PATENT DOCUMENTS

| | | |
|---|---|---|
| CN | 110832919 A | 2/2020 |
| CN | 113543200 A | 10/2021 |

(Continued)

OTHER PUBLICATIONS

Application No. PCT/CN2021/128739 , International Search Report and Written Opinion, Mailed on May 27, 2022, 10 pages.

(Continued)

*Primary Examiner* — Faruk Hamza
*Assistant Examiner* — Cassandra L Decker
(74) *Attorney, Agent, or Firm* — Kilpatrick Townsend & Stockton LLP

(57) ABSTRACT

Provided is a method for a user equipment (UE). The UE may performs at least one of: monitoring physical downlink control channels (PDCCHs) in a Type0-PDCCH common search space (CSS) set over one or two consecutive slots, starting from a slot index n_0, with a 480 kHz or 960 kHz subcarrier spacing (SCS); transmitting, to a base station (BS), a report of a UE capability related to search space configurations for multi-slot PDCCH monitoring; or performing a monitoring occasion (MO) shifting operation for a first group of search space (SS) sets in response to a determination that a second group of SS sets is updated.

18 Claims, 12 Drawing Sheets

Consecutive slots for SSB and Type0-CSS, S=8

SSB Slots Region          SSB Slots Region

| 0 | | 3 | | | 7 | | 10 | | 13 | | | 17 | |

Reserved for UL,N=2

Type0-CSS   SSB #6      Type0-CSS   SSB #7

Same DL beam (Pairing)      Same beam (Pairing)

(56) References Cited

U.S. PATENT DOCUMENTS

| | | | | |
|---|---|---|---|---|
| 2022/0287063 A1* | 9/2022 | Lin | ....................... | H04L 5/0053 |
| 2022/0322117 A1* | 10/2022 | Choi | ..................... | H04W 24/08 |
| 2022/0338035 A1* | 10/2022 | Nam | ................. | H04W 72/0446 |
| 2023/0119439 A1* | 4/2023 | Kim | .................. | H04L 27/26025 |
| | | | | 370/329 |
| 2023/0155799 A1* | 5/2023 | Shin | ..................... | H04J 11/0073 |
| | | | | 370/329 |
| 2024/0260010 A1* | 8/2024 | Davydov | .............. | H04L 5/0053 |
| 2024/0349292 A1* | 10/2024 | Choi | ....................... | H04L 27/26 |
| 2024/0388482 A1 | 11/2024 | He et al. | | |

FOREIGN PATENT DOCUMENTS

| | | | |
|---|---|---|---|
| WO | 2021005663 A1 | 1/2021 | |
| WO | 2021205384 A1 | 10/2021 | |

OTHER PUBLICATIONS

Revised WID: Extending current NR operation to 71 GHz, CMCC, 3GPP TSG RAN Meeting #90-e, RP-202925, Dec. 7-11, 2020, 6 pages.

3rd Generation Partnership Project; Technical Specification Group Radio Access Network; NR; Physical layer procedures for control (Release 16), 3GPP TS 38.213 V16.7.0, Sep. 2021, 188 pages.
3rd Generation Partnership Project; Technical Specification Group Radio Access Network; NR; Radio Resource Control (RRC) protocol specification (Release 16), 3GPP TS 38.331 V16.6.0, Sep. 2021, 961 pages.
International Patent Application No. PCT/CN2021/128739, International Preliminary Report on Patentability, May 16, 2024, 6 pages.
Corrections to 38.213 Including 1,2 Alignment of Terminology Across Specifications, Samsung, 3 Generation Partnership Project Technical Specification Group-Radio Access Network Working Group 4 Meeting1 Meeting #97, R1-1907965, May 13-17, 2019, 31 pages.
Discussion on PDCCH Enhancements for Above 52.6 GHZ, Apple Inc, 3 Generation Partnership Project Technical Specification Group-Radio Access Network Working Group 1 #104b-e, R1-2103097, Apr. 12-Apr. 20, 2021, 7 pages.
Initial Access Aspects for Up to 71ghz Operation, CATT, 3 Generation Partnership Project Technical Specification Group-Radio Access Network Working Group 1 Meeting #104-e, R1-2100370, Jan. 25-Feb. 5, 2021, 6 pages.
European Patent Application No. 21962880.7, Partial Supplementary European Search Report, Jun. 30, 2025, 21 pages.

* cited by examiner

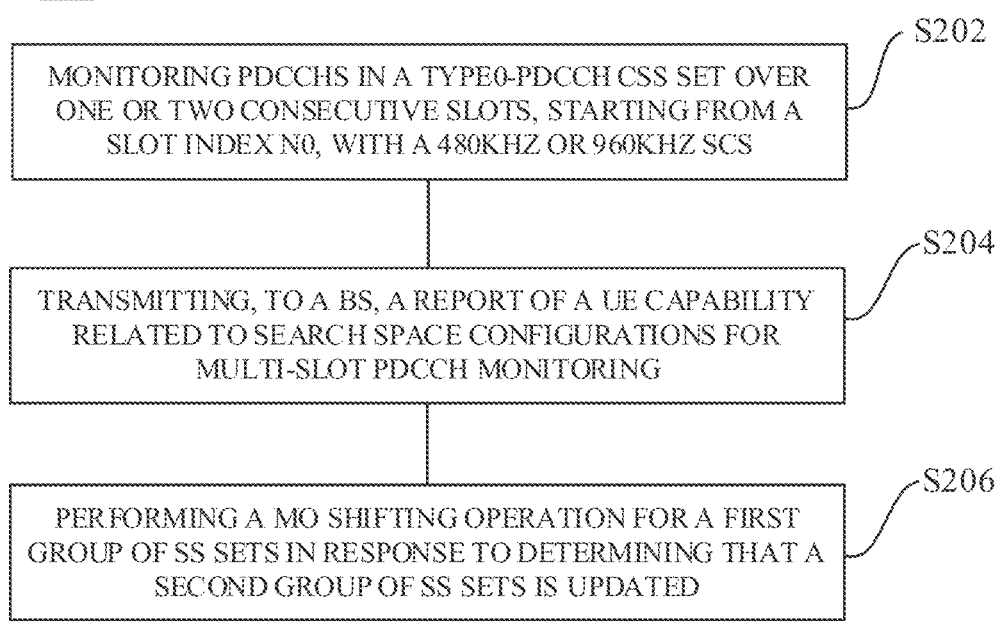

200

MONITORING PDCCHS IN A TYPE0-PDCCH CSS SET OVER ONE OR TWO CONSECUTIVE SLOTS, STARTING FROM A SLOT INDEX N0, WITH A 480KHZ OR 960KHZ SCS — S202

TRANSMITTING, TO A BS, A REPORT OF A UE CAPABILITY RELATED TO SEARCH SPACE CONFIGURATIONS FOR MULTI-SLOT PDCCH MONITORING — S204

PERFORMING A MO SHIFTING OPERATION FOR A FIRST GROUP OF SS SETS IN RESPONSE TO DETERMINING THAT A SECOND GROUP OF SS SETS IS UPDATED — S206

FIG. 2

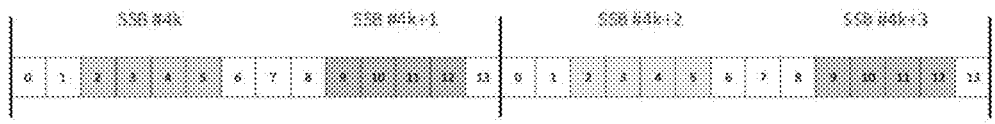
FIG. 3
Consecutive slots for SSB and Type0-CSS, S=8
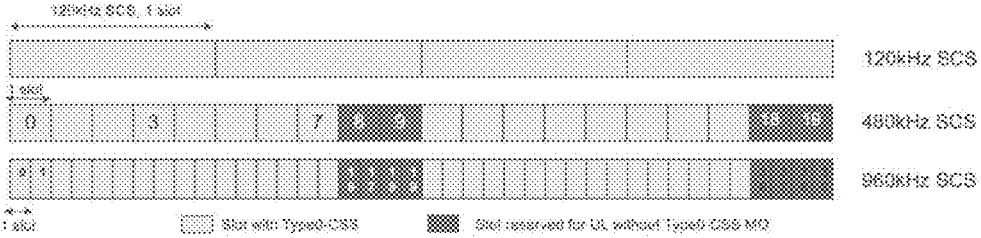
FIG. 4A
FIG. 4B

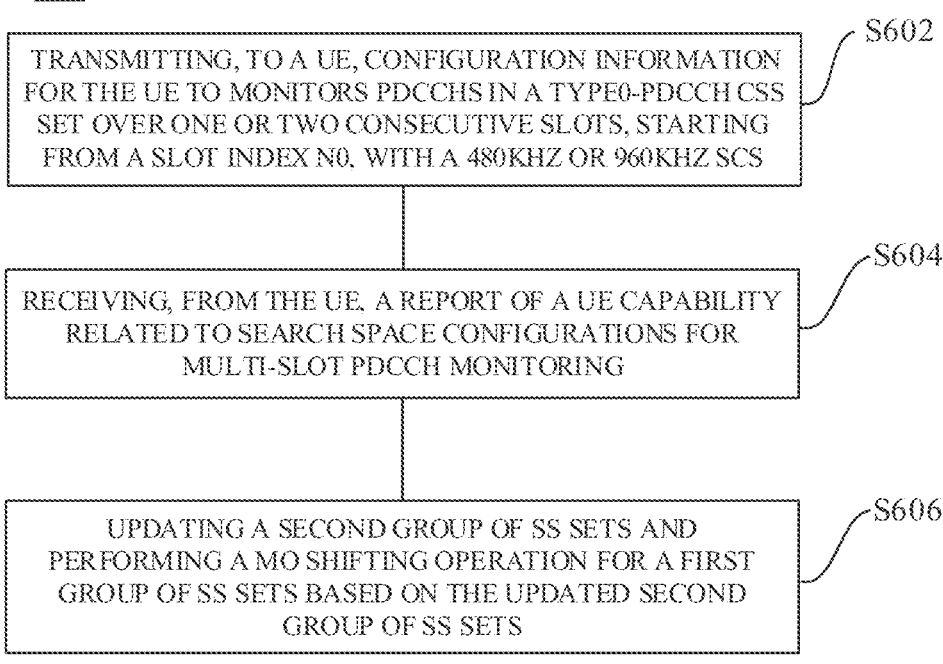

<u>600</u>

S602

TRANSMITTING, TO A UE, CONFIGURATION INFORMATION FOR THE UE TO MONITORS PDCCHS IN A TYPE0-PDCCH CSS SET OVER ONE OR TWO CONSECUTIVE SLOTS, STARTING FROM A SLOT INDEX N0, WITH A 480KHZ OR 960KHZ SCS

S604

RECEIVING, FROM THE UE, A REPORT OF A UE CAPABILITY RELATED TO SEARCH SPACE CONFIGURATIONS FOR MULTI-SLOT PDCCH MONITORING

S606

UPDATING A SECOND GROUP OF SS SETS AND PERFORMING A MO SHIFTING OPERATION FOR A FIRST GROUP OF SS SETS BASED ON THE UPDATED SECOND GROUP OF SS SETS

MONITORING UNIT
710

TRANSMITTING UNIT
720

PERFORMING UNIT
730

FIG. 7

SYSTEM INFORMATION SCHEDULING WITH MULTI-SLOTS PDCCH MONITORING OPERATION IN WIRELESS COMMUNICATION

CROSS REFERENCE TO RELATED APPLICATION

This application is a 371 U.S. National Phase of PCT International Patent Application No. PCT/CN2021/128739, filed Nov. 4, 2021, which is herein incorporated by reference in its entirety for all purposes.

TECHNICAL FIELD

This application relates generally to wireless communication systems, and more specifically to System Information Scheduling with Multi-slots PDCCH Monitoring Operation in Wireless Communication.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that includes at least one of: monitoring physical downlink control channels (PDCCHs) in a Type0-PDCCH common search space (CSS) set over one or two consecutive slots, starting from a slot index $n_0$, with a 480 kHz or 960 kHz subcarrier spacing (SCS); transmitting, to a base station (BS), a report of a UE capability related to search space configurations for multi-slot PDCCH monitoring; or performing a monitoring occasion (MO) shifting operation for a first group of search space (SS) sets in response to a determination that a second group of SS sets is updated.

According to an aspect of the present disclosure, a method for a network device is provided that includes at least one of: transmitting, to a user equipment (UE), configuration information for the UE to monitor physical downlink control channels (PDCCHs) in a Type0-PDCCH common search space (CSS) set over one or two consecutive slots, starting from a slot index $n_0$, with a 480 kHz or 960 kHz subcarrier spacing (SCS); receiving, from the UE, a report of a UE capability related to search space configurations for multi-slot PDCCH monitoring; or updating a second group of SS sets and performing a monitoring occasion (MO) shifting operation for a first group of search space (SS) sets based on the updated second group of SS sets.

According to an aspect of the present disclosure, an apparatus for a user equipment (UE) is provided that includes one or more processors configured to perform steps of the method according to the present disclosure.

According to an aspect of the present disclosure, an apparatus of a network device is provided that includes one or more processors configured to perform steps of the method according to the present disclosure.

According to an aspect of the present disclosure, a computer readable medium is provided that has computer programs stored thereon, which when executed by one or more processors, cause an apparatus to perform steps of the method according to the present disclosure.

According to an aspect of the present disclosure, an apparatus for a communication device is provided that includes means for performing steps of the method according to perform steps of the method according to the present disclosure.

According to an aspect of the present disclosure, a computer program product is provided that includes computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 2 illustrates a flowchart for an exemplary method for a user equipment in accordance with some embodiments.

FIG. 3 illustrates exemplary SSBs in slots.

FIGS. 4A, 4B, and 4C illustrate exemplary Type0-CSS locations according to various embodiments.

FIG. 6 illustrates a flowchart for an exemplary method for a network device in accordance with some embodiments.

FIG. 7 illustrates an exemplary block diagram of an apparatus for a UE in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless communication, support multi-slot span monitoring has been proposed by the challenging that OFDM symbol duration associated with large SCS becomes quite short e.g., ⅛ with 960 kHz SCS compared to that of 120 KHz. Multi-slot PDCCH monitoring reduces the periodicity of PDCCH monitoring at a UE so as to allow more time for the UE to process the PDCCH candidates.

Figure 1:
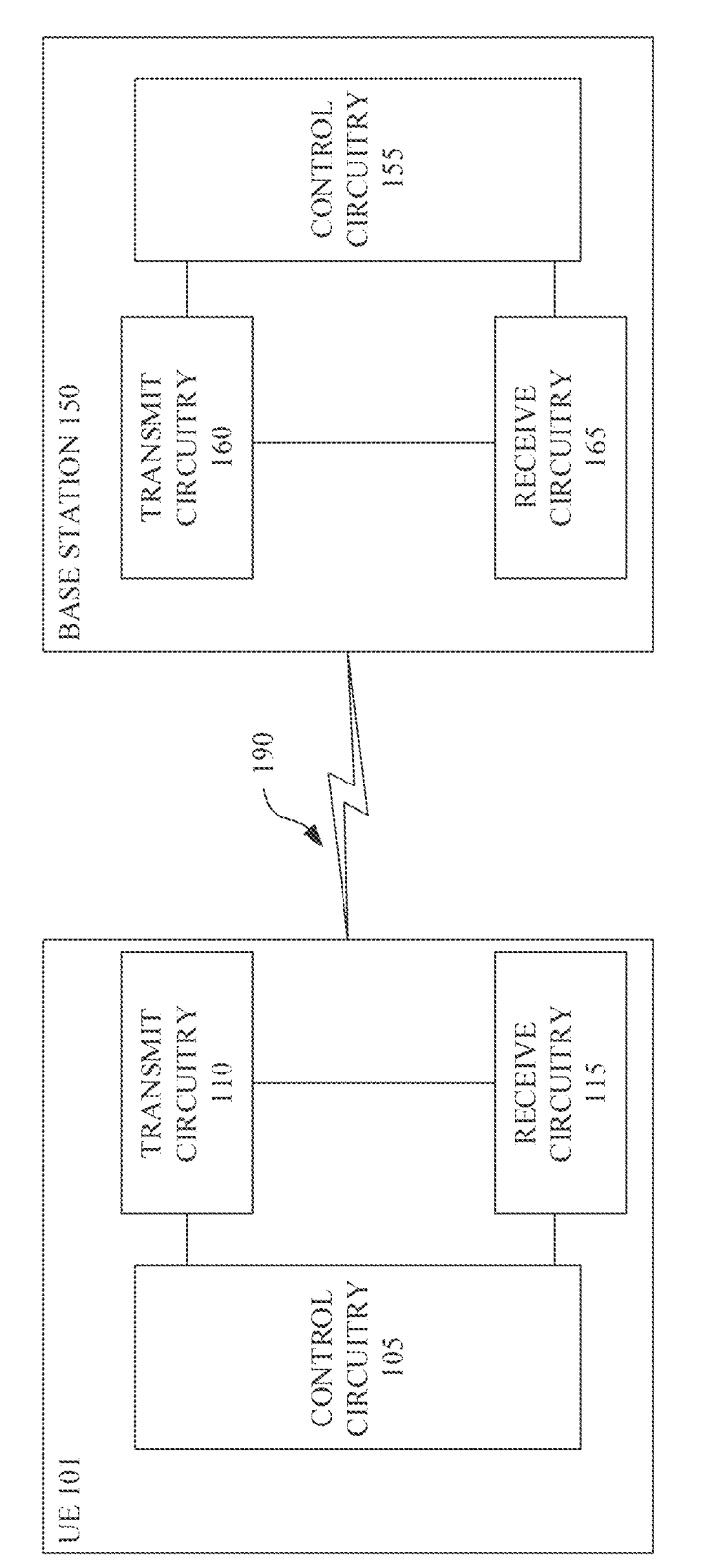
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120-degree area with an array of antennas directed to each sector to provide 360-degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person-to-person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is included of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is included of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and the network device described in the following embodiments may be implemented by the UE 101 and the base station 150 described in FIG. 1.

FIG. 2 illustrates a flowchart for an exemplary method for a user equipment in accordance with some embodiments. The method 200 illustrated in FIG. 2 may be implemented by the UE 101 described in FIG. 1.

In some embodiments, the method 200 for UE may include at least one of the following steps: S202, monitoring physical downlink control channels (PDCCHs) in a Type0-PDCCH common search space (CSS) set over one or two consecutive slots, starting from a slot index n_0, with a 480 kHz or 960 kHz subcarrier spacing (SCS); S204, transmitting, to a base station (BS), a report of a UE capability related to search space configurations for multi-slot PDCCH monitoring; or S206, performing a monitoring occasion (MO) shifting operation for a first group of search space (SS) sets in response to a determination that a second group of SS sets is updated.

According to some embodiments of the present disclosure, a better system information scheduling with multi-slots PDCCH monitoring operation in wireless communication can be obtained.

A revised WID RP-202925 was approved in RAN #90 to extends NR operation up to 71 GHZ considering, both, licensed and unlicensed operation. This study item will include the following objectives related to downlink control channels: support enhancement to PDCCH monitoring, including blind detection/CCE budget, and multi-slot span monitoring, potential limitation to UE PDCCH configuration and capability related to PDCCH monitoring.

In addition, the following was agreed in RAN1 106-e Meeting for synchronization signal block (SSB) Pattern: For 480 kHz and 960 kHz sub-carrier spacing (SCS), first symbols of the candidate SSB have index {2, 9}+14*n, where index 0 corresponds to the first symbol of the first slot in a half-frame.

Referring to FIG. 3 for details, where an exemplary relationship between slots and SSBs are shown.

Among others, the following issues were identified and remain open:

How to determine the slot index for 64 or 128 candidates SSBs

In particular, whether to reserve slots within the SSB bursts for UL transmissions such that the latency required for URLLC traffic can be met or even further improved compared to Rel-15/16 on low-band Additionally, the Type0-CSS MOs need to be designed accordingly to achieve the design target.

How to design the UE capability report for multi-slot PDCCH monitoring capacity report How to determine the BD/CCE budget for PDCCH overbooking handling if UE reports to support different PDCCH configuration capabilities for a given SCS Detailed solution to couple the Group #2 CSS and Group #1 SSS for MO update e.g., when beam failure recovery is completed In the following, each step of the method 200 will be described in details.

At step S202, the UE monitors physical downlink control channels (PDCCHs) in a Type0-PDCCH common search space (CSS) set over one or two consecutive slots, starting from a slot index n_0, with a 480 kHz or 960 kHz subcarrier spacing (SCS). According to certain aspects of this disclosure, a variety of approaches may be considered for monitoring Type0-PDCCH CSS sets.

In some embodiments, the monitoring may include monitoring the PDCCHs in the Type0-PDCCH CSS set over two consecutive slots $n_0$ and $n_0+1$; or monitoring the PDCCHs in the Type0-PDCCH CSS set over one slot $n_0$. In such embodiments, a UE may monitor PDCCH in the Type0-PDCCH CSS set over two consecutive slots (i.e., slot $n_0$ and $n_0+1$) with 480 kHz and 960 kHz starting from slot staring from slot $n_0$. Alternatively, a UE may only monitor slot for Type0-CSS by default. In another alternative, monitoring one or two slots for Type0-CSS may be indicated explicitly.

In some embodiments, the slot index $n_0$ may be determined by the UE as $$n_0 = (O*2^\mu + \lfloor i*M \rfloor) \bmod N_{slot}^{frame,\mu},$$

where i is an index for a synchronization signal block (SSB) associated with the Type0-PDCCH CSS set, O and M are parameters provided by the BS, $$M \in \{1, 1/2, 2\}, \text{ and } N_{slot}^{frame,\mu}$$

denotes a number of slots per frame for SCS configuration μ. In that case, for SSB with index i, the UE may determine an index slot $$n_0 \text{ as } n_0 = (0*2^\mu + \lfloor i*M \rfloor) \bmod N_{slot}^{frame,\mu}, \text{ where } M \in \{1, 1/2, 2\}$$

and the value O are provided by MIB information. Then, a UE may monitor PDCCH in the Type0-PDCCH CSS set over two consecutive slots with 480 kHz and 960 kHz starting from slot staring from slot $n_0$ (i.e., slot $n_0$ and $n_0+1$), or alternatively, a UE may monitor PDCCH in the Type0-PDCCH CSS set over slot $n_0$.

In some other embodiments, the equation may be modified such that 'N' slots are reserved for UL transmission after 'S' consecutive SSB slots. For example, the slot index $n_0$ may be determined by the UE as $$n_0 = (O*2^\mu + \lfloor k*M \rfloor) \bmod N_{slot}^{frame,\mu}, \; k = i + N*\lfloor i/S \rfloor,$$

where i is an index for a synchronization signal block (SSB) associated with the Type0-PDCCH CSS set, N is the number of consecutive slots are reserved for uplink transmission after S consecutive SSB slots, O and M are parameters provided by the BS, M∈{1, ½, 2}, and $$N_{slot}^{frame,\mu}$$

denotes a number of slots per frame for SCS configuration μ. Then, similarly, a UE may monitor PDCCH in the Type0-PDCCH CSS set over two consecutive slots with 480 kHz and 960 kHz starting from slot staring from slot $n_0$ (i.e., slot $n_0$ and $n_0+1$), or alternatively, a UE may monitor PDCCH in the Type0-PDCCH CSS set over slot $n_0$.

Figure 4C:
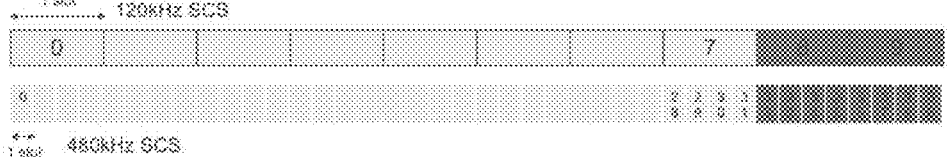

FIGS. 4A-4C provide examples of Type0-CSS location with different Embodiments. It can be seen that commonly for all FIGS. 4A-4C, the SSB and associated Type0-CSS are always located in a same half-slot. As one consequence, the SSB and SIBI can be delivered together in a same half slot and improve the beam-sweeping efficiency.

Comparing to the Rel-15 or Rel-16 approach, the modified equation excludes the following slots for Type0-CSS transmission to achieve the 'self-contained' SSB/Type0-CSS in a half slot.

In some embodiments, (S, N)=(8,2) both 480 kHz SCS and 960 kHz SCS. Referring to FIG. 4A for details, where (S, N)=(8,2) for both 480 kHz (μ=5) and 960 kHz SCS (μ=6). FIG. 4A illustrates Type0-CSS Monitoring Occasions where (S, N)=(8,2). In that case, slots <8, 9, 18, 19, 28, 29, 38, 39, . . . > may not be used for Type0-CSS.

In some other embodiments, (S,N)=(8,2) for 480 kHz SCS and (S,N)=(16,4) for 960 kHz SCS. Referring to FIG. 4B for details, where (S, N)=(8,2) for 480 kHz SCS and (S, N)=(16,4) for 960 kHz SCS. FIG. 4B illustrates Type0-CSS Monitoring Occasions where (S, N)=(8,2) for 480 and (S, N)=(16,4) for 960 kHz SCS. As a result, for 480 kHz SCS, same slots may be used as in the case of FIG. 4A, while for 960 kHz SCS, slots <16, 17, 18, 19, 36, 37, 38, 39 . . . > may be used.

In some alternative embodiments, (S,N)=(32,8) for 480 kHz SCS in a case that a maximum number of candidates SSB blocks is 128 for 480 kHz SCS. Referring to FIG. 4C for details, where (S, N)=(32,8) for 480 kHz SCS if the maximum number of SSB Blocks is 128 for 480 KHz SCS. FIG. 4C illustrates Type0-CSS Monitoring Occasions where (S, N)=(32,8). Therefore, slots <32,33,34,35,36,37,38,39> may be used for 480 KHz SCS. Such a design may be motivated to align the time location of reserved UL slots with the legacy Case D pattern defined for 120 kHz SCS on FR2-1 in Rel-15 to achieve a same UL transmission latency.

In some optional embodiments, the determined $n_0$ only applies to a Type0-PDCCH CSS configuration with O=0 and M=½. In such designs, the modified equation above may be only applied for the configuration with O=0 and M=½. This is mainly motivated to ensure the SSB and the associated Type0-PDCCH CSS occasion in a same half-slot and therefore beam sweeping latency for the SSB and associated Type0-PDCCH CSS can be minimized, as illustrated in FIGS. 4A, 4B, and 4C.

In some of the embodiments, the value of O and M are provided by the BS in a master information block (MIB).

Returning to FIG. 2, at step S202, according to some other embodiments of the disclosure, the monitoring may include monitoring the PDCCHs in the Type0-PDCCH CSS set over two consecutive slots $n_0$ and $n_0+1$ with a reference SCS; or monitoring the PDCCHs in the Type0-PDCCH CSS set over one slot $n_0$ with the reference SCS. In such embodiments, a UE may monitor PDCCH in the Type0-PDCCH CSS set over a first slot within 480 kHz or 960 kHz SCS in two consecutive slots with a reference SCS starting from slot $n_0$. Alternatively, a UE may only monitor slot for Type0-CSS by default. In another alternative, monitoring one or two slots for Type0-CSS may be indicated explicitly.

In some embodiments, the reference SCS may be predefined as 120 kHz SCS. For example, in some designs, the reference SCS may be hard-encoded in 3GPP specification as 120 KHz SCS.

In some other embodiments, the reference SCS is provided by the BS by selecting one from 120 kHz SCS and 240 kHz SCS. In that case, the reference SCS may be explicitly provided by gNB by selecting one from two candidates of <120 kHz, 240 kHz> SCS.

Optionally, a reserved bit field, R, in a master information block (MIB) may be used by the BS to indicate the reference SCS. The reserved bit field 'R' in the MIB may be used to indicate one from two candidate values. Alternatively, a 1-bit reference SCS information, b(0), may be used by the BS to indicate the reference SCS by selection of a scrambling sequence, w=[$W_0$, $W_1$, . . . , $W_{23}$], to scramble cyclic redundancy check (CRC) bits of a physical broadcast channel (PBCH). In such a case, the 1-bit reference SCS information may be carried by selection of scrambling sequence to scramble the CRC bits of PBCH, e.g., as defined in Table 1 below.

TABLE 1

| Indication of reference SCS for Type0-CSS MO determination | |
| --- | --- |
| b(0) | w = [$w_0$, $w_1$, . . . , $w_{23}$] |
| 0 (Using 120 kHZ as reference) | [0, 0, 0, . . . , 0] |
| 1 (Using 240 kHz as reference) | [1, 1, 1, . . . , 1] |

As can be seen from Table 1, b(0)=0 and w=[0,0, . . . , 0] may indicate that the 120 KHz SCS is used as the reference SCS, and b(0)=1 and w=[1,1, . . . , 1] may indicate that the 240 kHz SCS is used as the reference SCS.

In some embodiments, the slot index $n_0$ may be determined by the UE as $$n_0 = (O*2^\mu + \lfloor i*M \rfloor * 2^{(\mu-ref)}) \bmod N_{slot}^{frame,\mu},$$

where i is an index for a synchronization signal block (SSB) associated with the Type0-PDCCH CSS set, O and M are parameters provided by the BS, M∈{1, ½,2}, ref is an index for the reference SCS, and $$N_{slot}^{frame,\mu}$$

denotes a number of slots per frame for SCS configuration μ. According to some of the embodiments, the equation $$n_0 = (0*2^\mu + \lfloor i*M \rfloor * 2^{(\mu-ref)}) \bmod N_{slot}^{frame,\mu}$$

may be used without support the UL slot reservation, where μ=5 for 480 kHz and μ=6 for 960 kHz SCS, respectively. For a reference SCS of 120 kHz SCS, ref=3.

Figure 4D:
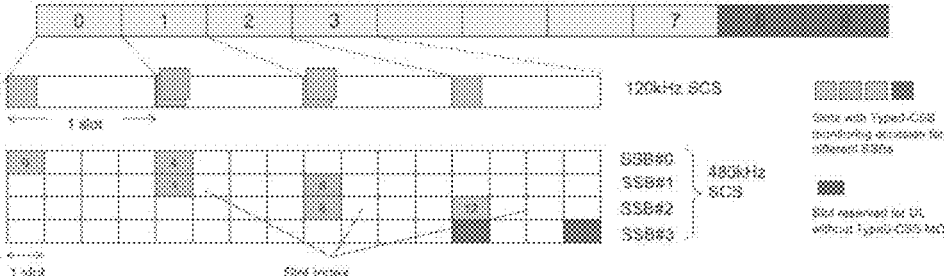
FIG. 4D illustrates exemplary Type0-PDCCH CSS Monitoring occasion according to some other embodiments.

In some other embodiments, the slot index $n_0$ may be determined by the UE as $$n_0 = (O*2^\mu + \lfloor k*M \rfloor * 2^{(\mu-ref)}) \bmod N_{slot}^{frame,\mu}, k = i + N * \lfloor i/S \rfloor,$$

where i is an index for a synchronization signal block (SSB) associated with the Type0-PDCCH CSS set, N is the number of consecutive slots that are reserved for uplink transmission after S consecutive SSB slots, O and M are parameters provided by the BS, M∈{1, ½, 2}, ref is an index for the reference SCS, and $$N_{slot}^{frame,\mu}$$

denotes a number of slots per frame for SCS configuration μ. In such embodiments, to support UL slot reservation for URLLC traffic operation, the slot determination equation may be further modified as $$n_0 = (0*2^\mu + \lfloor k*M \rfloor * 2^{(\mu-ref)}) \bmod N_{slot}^{frame,\mu},$$

wherein k=i+N*$\lfloor$i/S$\rfloor$, where the parameters 'N' and 'S' may reuse the definition above, and i is the SSB index. FIG. 4D provides one example of Type0-PDCCH CSS Monitoring occasion based on the modified equation and assuming a 480 KHz SCS.

As discussed below, $\mu=5$ for 480 kHz SCS, $\mu=6$ for 960 kHz SCS, and ref=3 in a case that 120 kHz SCS is used as the reference SCS.

In some embodiments, whether to monitor the PDCCHs in the Type0-CSS set over one or two consecutive slots is indicated by the BS using a PDCCH or MIB payload.

In RAN1 106bis-e Meeting, the following was agreed for multi-slot PDCCH monitoring including both CSS and USS based on slots within a slot group:

slot groups are consecutive and non-overlapping;

the start of the first slot group in a subframe is aligned with the subframe boundary; and the start of each slot group is aligned with a slot boundary At step S204, the UE transmits, to a base station (BS), a report of a UE capability related to search space configurations for multi-slot PDCCH monitoring.

In some embodiments, the first group of SS sets may include Type 1-PDCCH CSS with dedicated radio resource control (RRC) configuration, Type3-PDCCH CSS, and UE specific SS (USS), and the second group of SS sets may include Type0-PDCCH CSS, Type2-PDCCH CSS and Type1-PDCCH CSS without dedicated RRC configuration.

In other words, the PDCCH search space may be divided into the following types or groups:

Group #1 Search Space Set (SSS): Type-1 CSS with dedicated RRC configuration and Type3-CSS, UE specific SS (USS); and Group #2 SSS: Type0/0A. Type2-CSS and Type1-CSS without dedicated RRC configuration.

According to certain aspects of this disclosure, let's denote the number of consecutive slots for Group1 SSS within a slot group of X slots as $Y_{G1}$ and the number of consecutive slots for Group2CSS within a slot group X of slots as $Y_{G2}$. In some embodiments, the report of the UE capability may include a number, $Y_{G1}$, of consecutive slots for the first group of SS sets within a slot group of a supported size X, and a number, $Y_{G2}$, of consecutive slots for the second group of SS sets within a slot group of the supported size X.

In some embodiments, $Y_{G1} \in \{1,2\}$ and $Y_{G2} \in \{1,2\}$ may be supported by the UE for SCS configuration $\mu=5$ or 6. In other words, the following may be supported as candidate values for $Y_{G1}$ and $Y_{G2}$: $Y_{G2} \in \{1,2\}$; $Y_{G1} \in \{1,2\}$; ($\mu=5,6$).

Additionally or alternatively, X=4 and X=8 may be mandatorily supported by the UE for 480 kHz and 960 kHz SCS, respectively. For example, X=4 and X=8 may be mandatory supported and may be assumed during initial access for 480 kHz and 960 kHz SCS, respectively.

The value 'X=2' for 480 kHz SCS and 'X=4' for 960 kHz SCS are explicitly configured as part of search space configuration on a per UE basis based on the UE capability report.

Additionally or alternatively, 'X=2' for 480 kHz SCS and 'X=4' for 960 kHz may be configured by the BS as part of the search space configurations on a per UE basis. In other words, the value 'X=2' for 480 kHz SCS and 'X=4' for 960 kHz SCS may be explicitly configured as part of search space configuration on a per UE basis based on the UE capability report.

In some embodiments, the report of the UE capability may include at least one of following configurations:

for 480 kHz SCS:

i) $X = 4$ and $\langle Y_{G1}, Y_{G2} \rangle = \langle 2, 2 \rangle$;

ii) $X = 4$ and $\langle Y_{G1}, Y_{G2} \rangle = \langle 1, 1 \rangle$ or $\langle 1, 2 \rangle$; and iii) $X = 2$ and $\langle Y_{G1}, Y_{G2} \rangle = \langle 1, 1 \rangle$ or $\langle 1, 2 \rangle$;

for 960 kHz SCS:

1) $X = 8$ and $\langle Y_{G1}, Y_{G2} \rangle = \langle 4, 2 \rangle$;

2) $X = 8$ and $\langle Y_{G1}, Y_{G2} \rangle = \langle 2, 2 \rangle$;

3) $X = 8$ and $\langle Y_{G1}, Y_{G2} \rangle = \langle 1, 1 \rangle$ or $\langle 1, 2 \rangle$;

4) $X = 4$ and $\langle Y_{G1}, Y_{G2} \rangle = \langle 2, 2 \rangle$; and

5) $X = 4$ and $\langle Y_{G1}, Y_{G2} \rangle = \langle 1, 1 \rangle$ or $\langle 1, 2 \rangle$.

Table 2 illustrates an exemplary UE capability reporting table.

TABLE 2

| SCS | # of Config. | Value of 'X' | Value of $\langle Y_{G1}, Y_{G2} \rangle$ |
|---|---|---|---|
| 480 kHz SCS | Config. 1 | 4 | $\langle 2, 2 \rangle$ |
| | Config. 2 | 4 | $\langle 1, 1 \rangle$ or $\langle 1, 2 \rangle$ |
| | Config. 3 | 2 | $\langle 1, 1 \rangle$ or $\langle 1, 2 \rangle$ |
| 960 kHz SCS | Config. 1 | 8 | $\langle 4, 2 \rangle$ |
| | Config. 2 | 8 | $\langle 2, 2 \rangle$ |
| | Config. 3 | 8 | $\langle 1, 1 \rangle$ or $\langle 1, 2 \rangle$ |
| | Config. 4 | 4 | $\langle 2, 2 \rangle$ |
| | Config.5 | 4 | $\langle 1, 1 \rangle$ or $\langle 1, 2 \rangle$ |

It can be see from Table 2 that for 480 kHz SCS, in some designs, Config.2 may be mandated, and the support of Config.1 or Config.3 may be optionally reported by UE capability. In other words, in some embodiments, for 480 kHz SCS, configuration ii) is mandatory to be supported by the UE and configurations i) and iii) are selectively and optionally reported by the UE depending on UE capability.

It also can be see from Table 2 that for 960 KHz SCS, in some designs, Config.3 may be mandated. One or multiple from <Config.1, Config.2, Config 4, Config.5> may be optionally reported by UE capability. In other words, in some embodiments, for 960 kHz SCS, configuration 3) is mandatory to be supported by the UE and at least one of configuration 1), configuration 2), configuration 4) or configuration 5) is selectively and optionally reported by the UE depending on UE capability.

In some embodiments, the report of the UE capability further may include at least one combination of supported $\{X, \mu\}$ for the BS to determine a limit, $\langle M, C \rangle$, of number of blind decoding (BD)/control channel elements (CCEs) for each supported SCS configuration $\mu$, where M denotes a maximum number of monitored PDCCH candidates per slot and per serving cell and C denotes a maximum number of non-overlapped CCEs per slot and per serving cell.

According to certain aspects of this disclosure, the UE capability for the supported SCS may be reported using the format of $\{X, \mu\}$ to report the BD/CCE budget for each supported SCS $\mu$.

The BD/CCEs values based on the reported {X, u} may be commonly applied for all of configurations of different $\langle Y_{G1}, Y_{G2} \rangle$. Solutions for actual BD/CCE limit determination per multi-PDCCH monitoring when multiple Candidate values of 'X' are reported for a given SCS. For a given SCS, the BD/CCEs may be varied for different slot group size 'X' e.g., Config.1/2 vs. Config.3 of Table 2.

In some embodiments, for 480 kHz SCS, the limit of BD/CCE number is predefined as $\langle$ M=12, C=18$\rangle$ for X=2 and $\langle$ M=20, C=32$\rangle$ for X=4. For example, in some designs for 480 kHz SCS, $\langle M_1=12, C_1=18 \rangle$ may be hard-encoded in specification for X=2 and $\langle M_2=20, C_2=32 \rangle$ for X=4.

In addition, a UE may support both 'X=2' and 'X=4' configuration based on UE capability report. Thus, there might be a need to determine the actual limit to be used. According to certain aspects of this disclosure, a variety of solutions can be considered to determine the actual BD/CCE limit for candidate dropping for PCell In some embodiments, called as a first option hereby, the report of the UE capability may include support of a plurality of combinations of {X, μ} such that the BS is to determine, as the limit of BD/CCE number, a maximum value of respective limits of BD/CCE number of valid ones of the plurality of combinations. In such embodiments, if UE reports the support of more than one combination of C for a given SCS, and if multiple combinations of C are valid for the multi-PDCCH pattern, the maximum value of BD/CCE of the valid combinations may be applied.

Alternatively, called as a second option hereby, a value of X used for determination of the limit of BD/CCE number is configured by the BS through a dedicated radio resource control (RRC) signaling on a per UE or per UE per component carrier (CC) basis for a give SCS configuration μ. In other words, the value of used for actual BD/CCE limit determination may be configured by dedicated RRC signaling on a per UE or per UE Per CC basis for a given SCS μ.

In further alternatives, or named as a third option hereby, the limit of BD/CCE number may be determined by the BS based on the number of groups of consecutive slots in the larger slot group that is supported based on the UE capability report. In other words, the actual BD/CCE limit per multi-PDCCH pattern may be determined based on the number of (non-empty) slot group in the larger slot group, i.e., X=4 for 480 kHz SCS and X=8 for 960 kHz SCS.

Figure 5A:
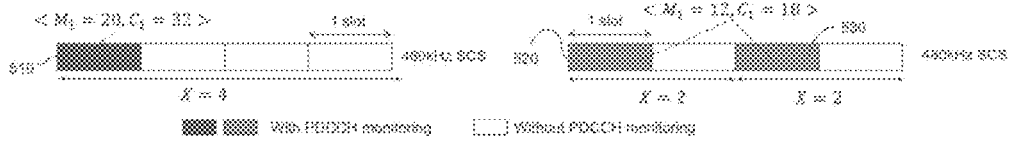
FIG. 5A and FIG. 5B illustrate exemplary BD/CCE budget determination according to various embodiments.

In some embodiments, in a case that there is one group of consecutive slots in a slot group of a size X=4 for 480 kHz SCS or X=8 for 960 kHz SCS, the limit of BD/CCE number is determined as a limit of BD/CCE number for X=4 for 480 kHz SCS or a limit of BD/CCE number for X=8 for 960 kHz SCS, respectively. That is, if there is a group of consecutive $Y_{G1}$ or $Y_{G2}$ slots in X=4 slots group for 480 kHz SCS or X=8 slots group for 960 kHz SCS, the actual BD/CCE limit may follow X=4 for 480 kHz SCS. i.e., $\langle M_2=20, C_2=32 \rangle$, and may follow X=8 for 960 kHz. Referring to e.g., slot 510 with 480 kHz SCS in FIG. 5A for details.

In some embodiments, in a case that there are two groups of consecutive slots in a slot group of a size X=4 for 480 kHz SCS or X=8 for 960 kHz SCS, the limit of BD/CCE number is determined as a limit of BD/CCE number for X=2 for 480 kHz SCS or a limit of BD/CCE number for X=4 for 960 kHz SCS, respectively. In other words, if there are two groups of consecutive slots $Y_{G1}$ or $Y_{G2}$ in X=4 slots group for 480 kHz SCS or X=8 slots group for 960 kHz SCS, the actual BD/CCE limit may follow X=2 for 480 kHz SCS, i.e., $\langle M_1=12, C_1=18 \rangle$, and may follow X=4 for 960 kHz SCS. Returning to FIG. 5A again, where examples where UE is configured two groups of consecutive slots in X=4 slots group are shown in slot 510 and slot 520 respectively.

Figure 5B:
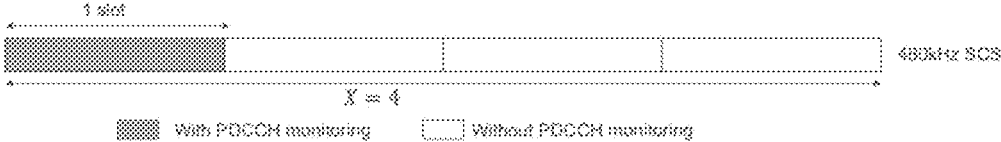

FIG. 5B illustrates exemplary BD/CCE budget determination when multiple X values are supported by UE, and in particular provides one example to determine the BD/CCE limit for 480 kHz SCS with the following assumption:

$$\langle M_1 = 12, C_1 = 18 \rangle \text{ for } X = 2$$
$$\langle M_2 = 20, C_2 = 32 \rangle \text{ for } X = 4$$

In this example, it was assumed that the UE was configured to monitor PDCCHs in slot #0 within X=4 slot group for multi-slot PDCCH monitoring. Therefore, for both the "first option" and the "second option" recited above, the UE may determine the BD/CCE budget based on X=4 i.e., $\langle M_2=20, C_2=32 \rangle$ for PDCCH candidates dropping.

Returning to FIG. 2, at step S206, the UE performs a monitoring occasion (MO) shifting operation for a first group of search space (SS) sets in response to a determination that a second group of SS sets is updated. Therefore, solutions on Group #1 SSS Modification with Multi-slots PDCCH are provided.

Figure 5C:
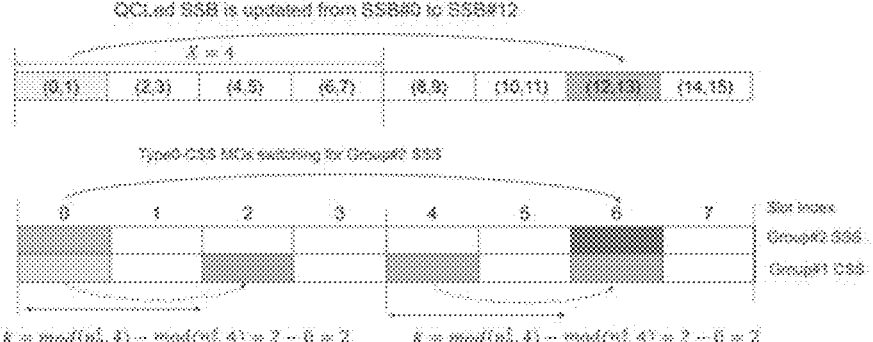
FIG. 5C illustrates exemplary slot shifting in accordance with some embodiments.

FIG. 5C illustrates exemplary slot shifting for Group 1 SSS based on the update of Group2 CSS. According to certain aspects of this disclosure, the group #1 SSS monitoring occasion may be shifted slots in time when the group #2 SSS is updated e.g., due to the QCLed SSB update after beam failure recovery procedure. In some embodiments, the MO shifting operation may include shifting MOs for the first group of SS sets by k slots in time in response to a determination that the second group of SS sets is updated due to a quasi co-located (QCLed) synchronization signal block (SSB) update process after a beam failure recovery procedure, where k denotes an offset value for the shifting.

Various approaches can be considered to determine the offset value 'k'. In some embodiments, after the beam failure recovery procedure for control resource set (CORESET) 0, the offset value k may be determined by the UE based on an index, $$n_0^s,$$

for a source SSB of the QCLed SSB update process and an index, $$n_0^t,$$

for a target SSB of the QCLed SSB update process.

In some embodiments, the offset value k may be determined by the UE as $$k = \mathrm{mod}(n_0^t, X) - \mathrm{mod}(n_0^s, X), \text{ if } n_0^s < n_0^t$$
$$k = X - (\mathrm{mod}(n_0^s, X) - \mathrm{mod}(n_0^t, X)), \text{ if } n_0^s > n_0^t.$$

For example, after beam recovery procedure for CORESET #0, the offset value 'k' for Group #1 SSS shifting may be implicitly determined by UE based on the slot $$`n_0^S,$$

for the source SSB and $$`n_0^T,$$

for the target SSB as the above equations.

Alternatively, the offset value k may be determined by the UE as $$k = n_0' - n_0^s.$$

Note that value k can be positive or negative, and adjusting the Group #1 SSS by a positive or a negative k slots may indicate advancing or deferring the MOs by a corresponding amount.

In some embodiments, the MO shifting operation further may include: updating. by the UE. CORESETs except CORESET 0 that has been configured with the source SSB as QCL source to use the target SSB after a predefined processing time from a last symbol of a first PDCCH reception in an SS set provided by a parameter recoverySearchSpaceId where the UE detects a downlink control information (DCI) format with cyclic redundancy check (CRC) scrambled by a cell radio network temporary identifier (C-RNTI) or modulation coding scheme cell radio network temporary identifier (MCS-C-RNTI). In other words, in some designs, the CORESETs except CORESET #0 that has been configured with 'source SSB' as QCL source may be updated by UE to use "target SSB" after a hard-encoded processing time from the last symbol of a first PDCCH reception in a search space set provided by recoverySearchSpaceId where a UE detects a DCI format with CRC scrambled by C-RNTI or MCS-C-RNTI.

Additionally or alternatively, the MO shifting operation further may include: feeding back, by the UE, a hybrid automatic repeat request acknowledgement (HARQ-ACK) for the detected DCI format with CRC scrambled by the C-RNTI or MCS-C-RNTI in the SS set provided by recoverySearchSpaceId. Therefore, the UE may furthermore feedback HARQ-ACK for the detected DCI format with CRC scrambled by C-RNTI or MCS-C-RNTI in the search space set provided by recoverySearchSpaceId to improve the reliability for Group #1 SSS shifting operation.

FIG. 6 illustrates a flowchart for an exemplary method for a network device in accordance with some embodiments. The method 600 illustrated in FIG. 6 may be implemented by the base station 150 described in FIG. 1. For example, the network device may be the network device of the base station 150.

In some embodiments, the method 600 for a network device may include at least one of the following steps: S602, transmitting, to a user equipment (UE), configuration information for the UE to monitors physical downlink control channels (PDCCHs) in a Type0-PDCCH common search space (CSS) set over one or two consecutive slots, starting from a slot index $n_0$, with a 480 kHz or 960 kHz subcarrier spacing (SCS); S604, receiving, from the UE, a report of a UE capability related to search space configurations for multi-slot PDCCH monitoring; or S606, updating a second group of SS sets and performing a monitoring occasion (MO) shifting operation for a first group of search space (SS) sets based on the updated second group of SS sets.

In the following, each step of the method 600 will be described in details.

At step S602, the network device transmits, to a user equipment (UE), configuration information for the UE to monitor physical downlink control channels (PDCCHs) in a Type0-PDCCH common search space (CSS) set over one or two consecutive slots, starting from a slot index $n_0$, with a 480 kHz or 960 kHz subcarrier spacing (SCS).

In some embodiments, transmitting of the PDCCHs by the UE may include: transmitting the PDCCHs in the Type0-PDCCH CSS set over one or two of two consecutive slots $n_0$ and $n_0+1$; or transmitting the PDCCHs in the Type0-PDCCH CSS set over one slot $n_0$. As discussed above, a UE may monitor PDCCH in the Type0-PDCCH CSS set over two consecutive slots (i.e., slot $n_0$ and $n_0+1$) with 480 kHz and 960 kHz starting from slot staring from slot $n_0$. Alternatively, a UE may only monitor slot for Type0-CSS by default. In another alternative, monitoring one or two slots for Type0-CSS may be indicated explicitly.

In some embodiments, the slot index $n_0$ may be determined by the BS as $$n_0 = (O * 2^\mu + \lfloor i * M \rfloor) \mathrm{mod} N_{slot}^{frame,\mu},$$

where i is an index for a synchronization signal block (SSB) associated with the Type0-PDCCH CSS set, O and M are parameters provided by the BS, $M \in \{1, \frac{1}{2}, 2\}$, and $$N_{slot}^{frame,\mu}$$

denotes a number of slots per frame for SCS configuration $\mu$.

In some embodiments, the slot index $n_0$ may be determined by the BS as $$n_0 = (O * 2^\mu + \lfloor k * M \rfloor) \mathrm{mod} N_{slot}^{frame,\mu}, k = i + N * \lfloor i/S \rfloor,$$

where i is an index for a synchronization signal block (SSB) associated with the Type0-PDCCH CSS set. N is the number of consecutive slots that are reserved for uplink transmission after S consecutive SSB slots, O and M are parameters provided by the BS, $M \in [1, \frac{1}{2}, 2]$, and $$N_{slot}^{frame,\mu}$$

denotes a number of slots per frame for SCS configuration $\mu$.

In some embodiments, transmitting of the PDCCHs by the BS may include: transmitting the PDCCHs in the Type0-PDCCH CSS set over one or two of two consecutive slots $n_0$ and $n_0+1$ with a reference SCS; or transmitting the PDCCHs in the Type0-PDCCH CSS set over one slot $n_0$ with the reference SCS.

In some embodiments, the reference SCS may be predefined as 120 kHz SCS. For example, the reference SCS may be hard-encoded in 3GPP specification as 120 kHz SCS.

Alternatively, the reference SCS is provided by the BS by selecting one from 120 kHz SCS and 240 kHz SCS.

In some embodiments, the slot index $n_0$ may be determined by the BS as $$n_0 = \left(O*2^\mu + \lfloor i*M \rfloor * 2^{(\mu-ref)}\right) \bmod N_{slot}^{frame,\mu},$$

where i is an index for a synchronization signal block (SSB) associated with the Type0-PDCCH CSS set, O and M are parameters provided by the BS, $M \in [1, 1/2, 2]$, ref is an index for the reference SCS, and $$N_{slot}^{frame,\mu}$$

denotes a number of slots per frame for SCS configuration μ.

In some alternatives, the slot index $n_0$ may be determined by the BS as $$n_0 = \left(O*2^\mu + \lfloor k*M \rfloor * 2^{(\mu-ref)}\right) \bmod N_{slot}^{frame,\mu}, \quad k = i + N * \lfloor i/S \rfloor,$$

where i is an index for a synchronization signal block (SSB) associated with the Type0-PDCCH CSS set, N is the number of consecutive slots that are reserved for uplink transmission after S consecutive SSB slots, O and M are parameters provided by the BS, $M \in [1, \frac{1}{2}, 2]$, ref is an index for the reference SCS, and $$N_{slot}^{frame,\mu}$$

denotes a number of slots per frame for SCS configuration μ.

At step S604, the network device receives, from the UE, a report of a UE capability related to search space configurations for multi-slot PDCCH monitoring.

In some embodiments, the first group of SS sets may include Type1-PDCCH CSS with dedicated radio resource control (RRC) configuration, Type3-PDCCH CSS, and UE specific SS (USS), and the second group of SS sets may include Type0-PDCCH CSS, Type2-PDCCH CSS and Type1-PDCCH CSS without dedicated RRC configuration.

In some embodiments, the report of the UE capability may include a number, $Y_{G1}$, of consecutive slots for the first group of SS sets within a slot group of a supported size X, and a number, $Y_{G2}$, of consecutive slots for the second group of SS sets within a slot group of the supported size X.

In some embodiments, the report of the UE capability further may include at least one combination of supported {X,μ} for the BS to determine a limit, $\langle M,C \rangle$, of number of blind decoding (BD)/control channel elements (CCEs) for each supported SCS configuration μ, where M denotes a maximum number of monitored PDCCH candidates per slot and per serving cell and C denotes a maximum number of non-overlapped CCEs per slot and per serving cell.

In some embodiments, the BS determines the limit of BD/CCE number including a maximum value of respective limits of BD/CCE number of valid ones of the plurality of combinations based on a plurality of combinations of {X, μ} in the report of the UE capability.

In some embodiments, a value of X used for determination of the limit of BD/CCE number may be configured by the BS through a dedicated radio resource control (RRC) signaling on a per UE or per UE per component carrier (CC) basis for a give SCS configuration μ.

In some embodiments, the limit of BD/CCE number may be determined by the BS based on the number of groups of consecutive slots in the larger slot group of that is supported based on the UE capability report.

At step S606, the network device updates a second group of SS sets and performs a monitoring occasion (MO) shifting operation for a first group of search space (SS) sets based on the updated second group of SS sets.

In some embodiments, the MO shifting operation may include shifting MOs for the first group of SS sets by k slots in time in response to a determination that the second group of SS sets is updated due to a quasi co-located (QCLed) synchronization signal block (SSB) update process after a beam failure recovery procedure, where k denotes an offset value for the shifting.

In some embodiments, after the beam failure recovery procedure for control resource set (CORESET) 0, the offset value k may be determined by the BS based on an index, $$n_0^s,$$

for a source SSB of the QCLed SSB update process and an index, $$n_0^t,$$

for a target SSB of the QCLed SSB update process.

In some embodiments, the offset value k may be determined by the BS as $$k = \bmod(n_0^t, X) - \bmod(n_0^s, X), \text{ if } n_0^s < n_0^t$$

$$k = X - (\bmod(n_0^s, X) - \bmod(n_0^t, X)), \text{ if } n_0^s > n_0^t.$$

Alternatively, the offset value k may be determined by the BS as $$k = n_0^t - n_0^s.$$

Figure 7:
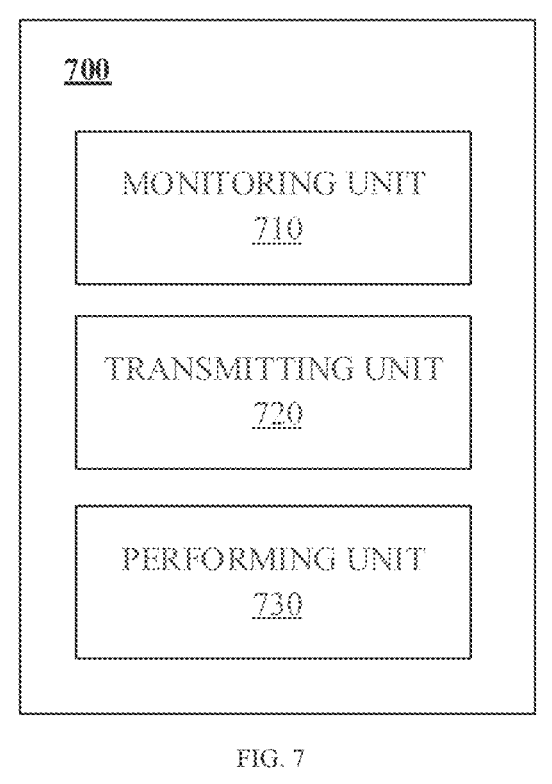

FIG. 7 illustrates an exemplary block diagram of an apparatus for a user equipment (UE) in accordance with some embodiments. The apparatus 700 illustrated in FIG. 7 may be used to implement the method 200 as illustrated in combination with FIG. 2.

As illustrated in FIG. 7, the apparatus 700 includes at least one of a monitoring unit 710, a transmitting unit 720, and a performing unit 730.

The monitoring unit 710 may be configured to monitor physical downlink control channels (PDCCHs) in a Type0-PDCCH common search space (CSS) set over one or two consecutive slots, starting from a slot index n_0, with a 480 kHz or 960 kHz subcarrier spacing (SCS).

The transmitting unit 720 may be configured to transmit, to a base station (BS), a report of a UE capability related to search space configurations for multi-slot PDCCH monitoring.

The performing unit 730 may be configured to perform a monitoring occasion (MO) shifting operation for a first group of search space (SS) sets in response to a determination that a second group of SS sets is updated.

According to the embodiments of the present application, a better system information scheduling with multi-slots PDCCH monitoring operation in wireless communication can be obtained.

Figure 8:
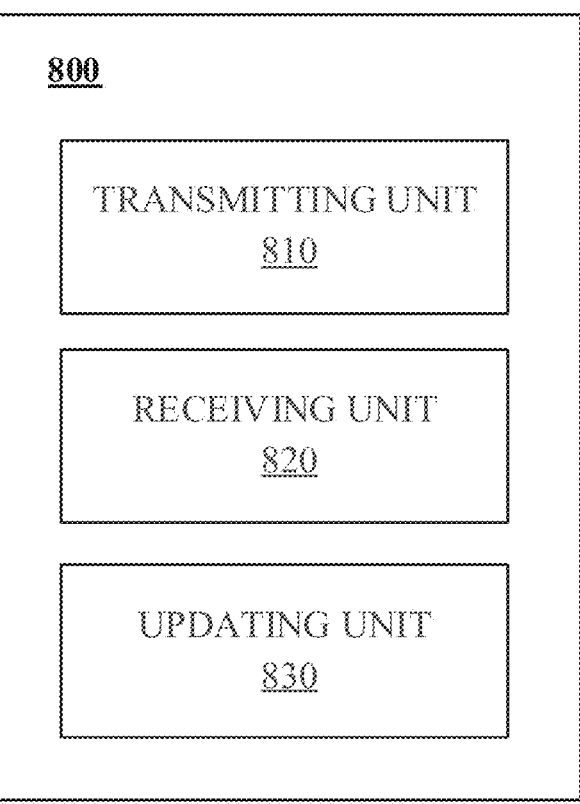
FIG. 8 illustrates an exemplary block diagram of an apparatus for a network device in accordance with some embodiments.

FIG. 8 illustrates an exemplary block diagram of an apparatus for a network in accordance with some embodiments. The apparatus 800 illustrated in FIG. 8 may be used to implement the method 600 as illustrated in combination with FIG. 6.

As illustrated in FIG. 8, the apparatus 800 includes at least one of a transmitting unit 810, a receiving unit 820, and an updating unit 830.

The transmitting unit 810 may be configured to transmit, to a user equipment (UE), configuration information for the UE to monitor physical downlink control channels (PDCCHs) in a Type0-PDCCH common search space (CSS) set over one or two consecutive slots, starting from a slot index n_0, with a 480 kHz or 960 kHz subcarrier spacing (SCS):

The receiving unit 820 may be configured to receive, from the UE, a report of a UE capability related to search space configurations for multi-slot PDCCH monitoring; or The updating unit 830 may be configured to update a second group of SS sets and to perform a monitoring occasion (MO) shifting operation for a first group of search space (SS) sets based on the updated second group of SS sets.

According to some embodiments of the present disclosure, a better system information scheduling with multi-slots PDCCH monitoring operation in wireless communication can be obtained.

In some embodiments, also disclosed is an apparatus for a UE, the apparatus comprising one or more processors configured to perform the method for a user equipment in accordance with any of the disclosed embodiments.

In some embodiments, also disclosed is an apparatus for a BS, the apparatus comprising one or more processors configured to perform the method for a network device in accordance with any of the disclosed embodiments.

In some embodiments, also disclosed is an apparatus for a communication device, comprising means for performing the method for a user equipment and/or the method for a network device in accordance with any of the disclosed embodiments.

In some embodiments, also disclosed is a computer readable medium having computer programs stored thereon which, when executed by an apparatus having one or more processors, cause the apparatus to perform the method for a user equipment and/or the method for a network device in accordance with any of the disclosed embodiments.

In some embodiments, also disclosed is a computer program product comprising computer programs which, when executed by an apparatus having one or more processors, cause the apparatus to perform the method for a user equipment and/or the method for a network device in accordance with any of the disclosed embodiments.

Figure 9:
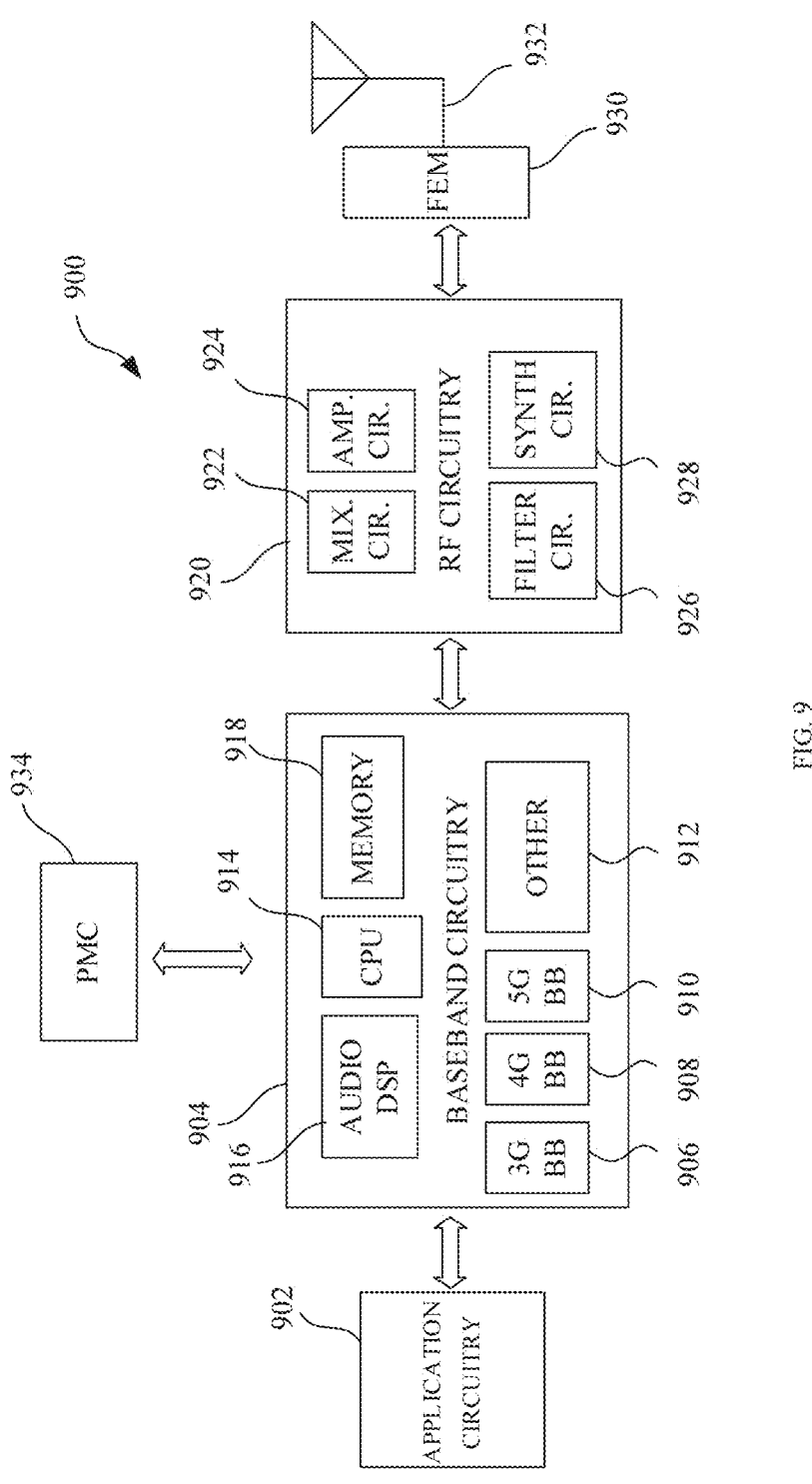
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC

934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may include passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer including a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in an EGE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 10:
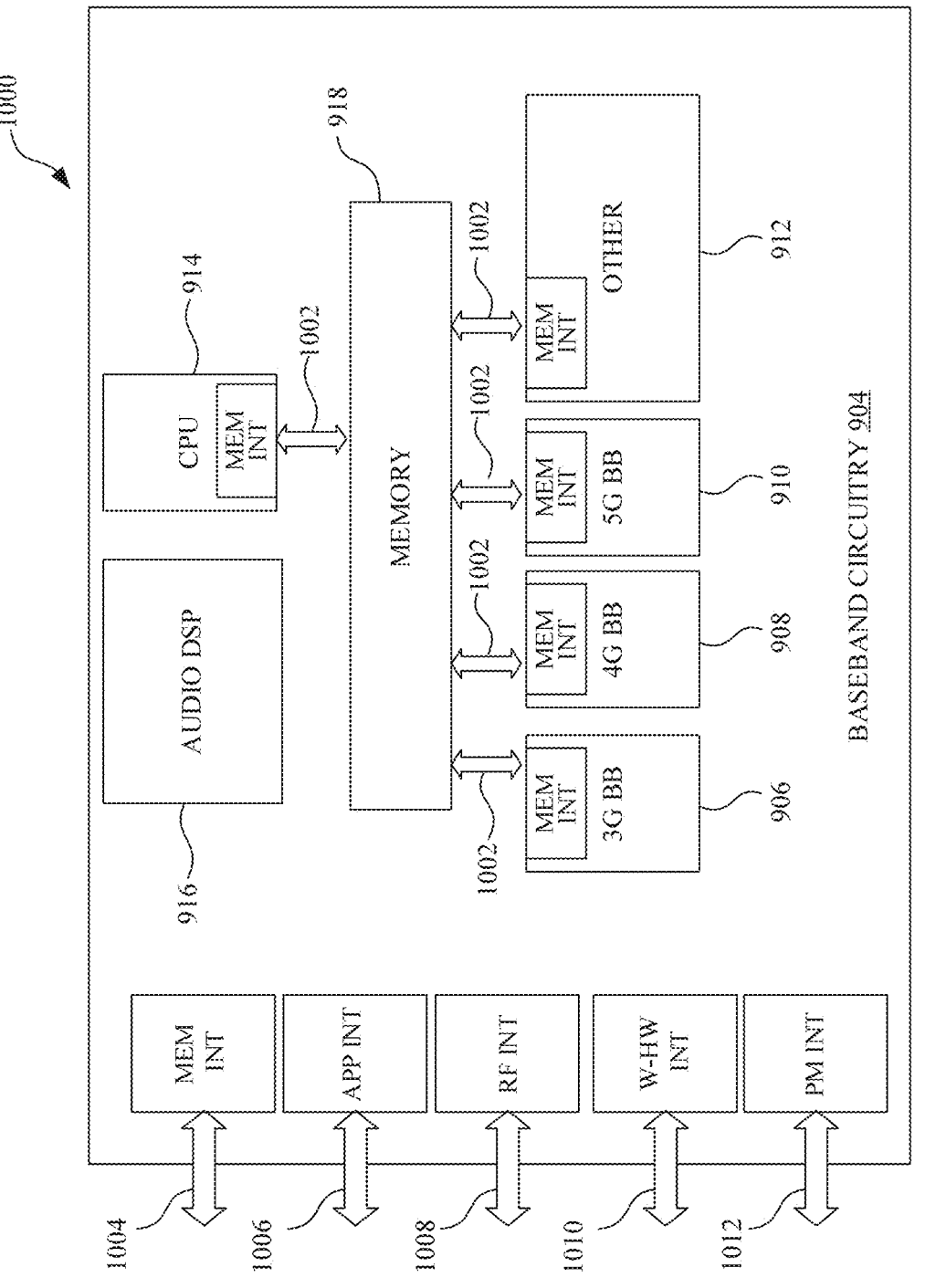
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 9 may include 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 1004 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 934.

Figure 11:
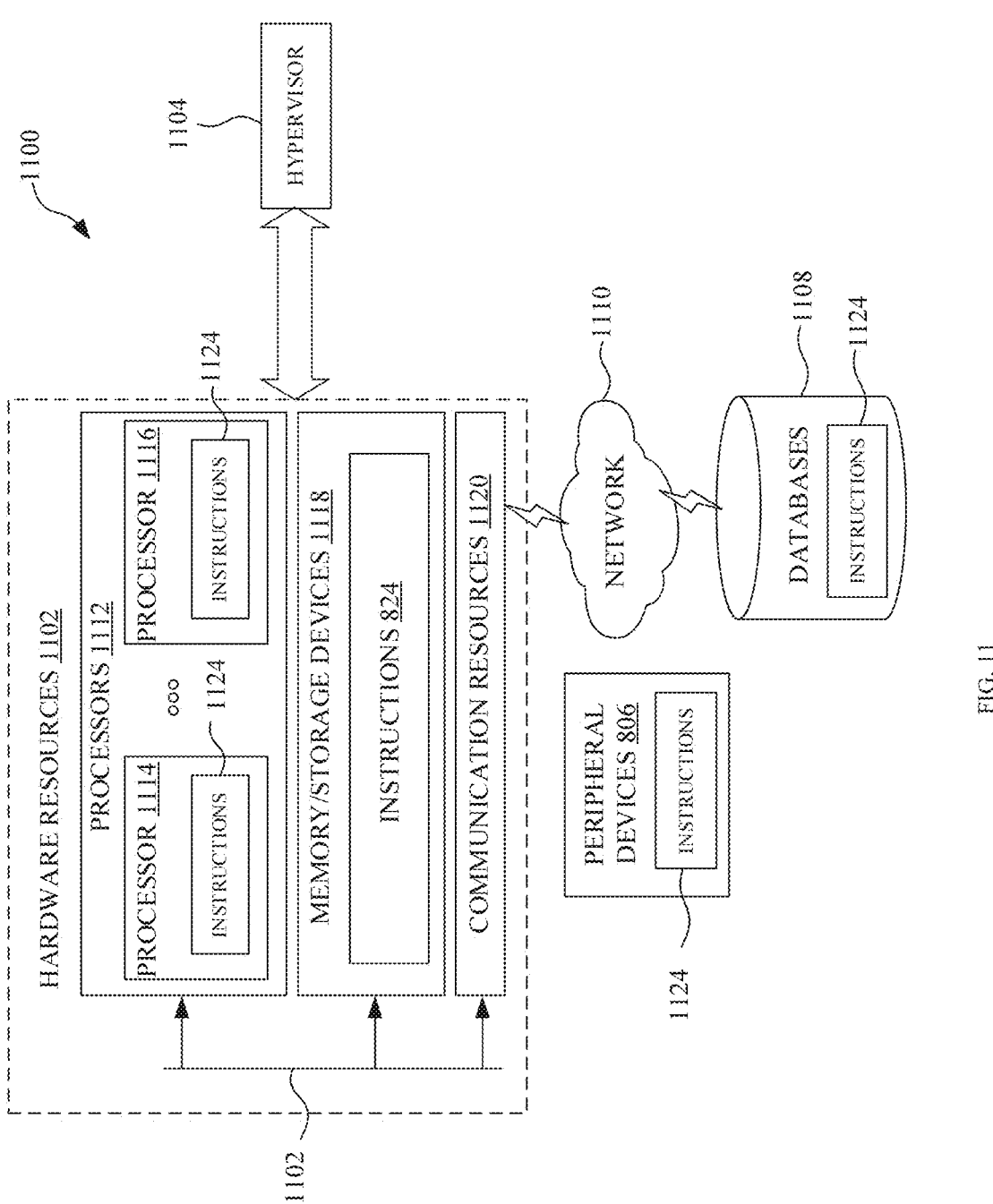
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM). Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may include software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
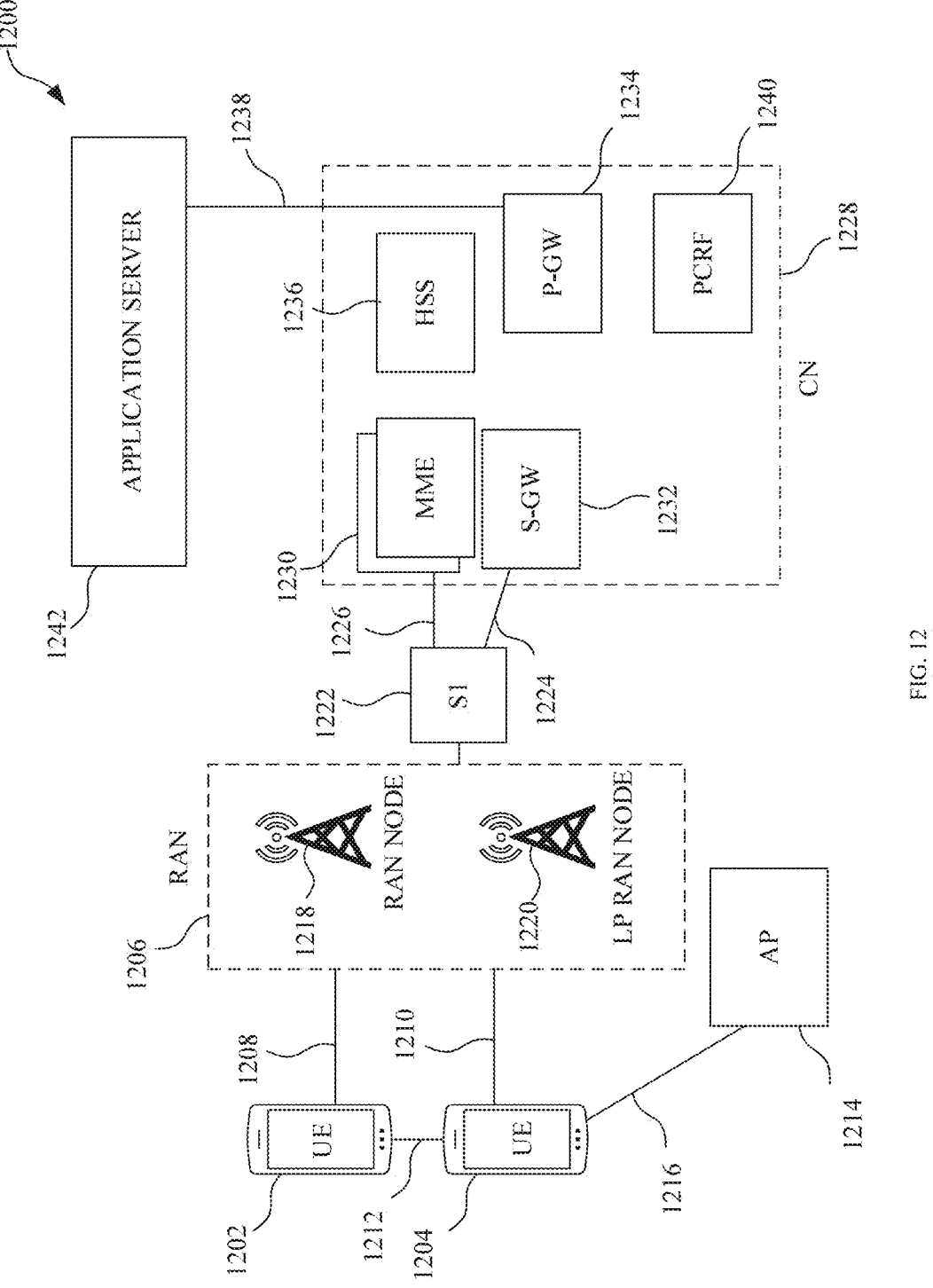
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which includes a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1214, via connection 1216. The connection 1216 can include a local wireless connection, such as a connection consistent with any IEEE 802.11 protocol, wherein the AP 1214 would include a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the EGE 1202 and the EGE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an S1 interface 1222. In embodiments, the CN 1228 may be an evolved packet core (EPC) network, a NextGen Packet Core (NPC) network, or some other type of CN. In this embodiment the S1 interface 1222 is split into two parts: the S1-U interface 1224, which carries traffic data between the macro RAN node 1218 and the LP RAN node 1220 and a serving gateway (S-GW), shown as S-GW 1132, and an S1-mobility management entity (MME) interface, shown as S1-MME interface 1226, which is a signaling interface between the macro RAN node 1218 and LP RAN node 1220 and the MME(s) 1230.

In this embodiment, the CN 1228 includes the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may include a database for network users, including subscription-related information to support the network entities handling of communication sessions. The CN 1228 may include one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the S1 interface 1222 towards the RAN 1206, and routes data packets between the RAN 1206 and the CN 1228. In addition, the S-GW 1232 may be a local mobility anchor point for inter-RAN node handovers and also may provide an anchor for inter-3GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1242 via an IP communications interface 1238. The application server 1242 can also be configured to support one or more communication services (e.g., Voice-over-Internet Protocol (VoIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QOS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method performed by a user equipment (UE), the method comprising: performing at least one of: monitoring physical downlink control channels (PDCCHs) in a Type0-PDCCH common search space (CSS) set over one or two consecutive slots, starting from a slot index $n_0$, with a 480 kHz or 960 kHz subcarrier spacing (SCS); transmitting, to a base station (BS), a report of a UE capability related to search space configurations for multi-slot PDCCH monitoring; or performing a monitoring occasion (MO) shifting operation for a first group of search space (SS) sets in response to a determination that a second group of SS sets is updated.

Example 2 is the method of Example 1, wherein the monitoring comprises: monitoring the PDCCHs in the Type0-PDCCH CSS set over two consecutive slots $n_0$ and $n_0+1$; or monitoring the PDCCHs in the Type0-PDCCH CSS set over one slot $n_0$.

Example 3 is the method of Example 2, wherein the slot index $n_0$ is determined by the UE as $$n_0 = (O*2^\mu + \lfloor i*M \rfloor) \bmod N_{slot}^{frame,\mu},$$

wherein i is an index for a synchronization signal block (SSB) associated with the Type0-PDCCH CSS set, O and M are parameters provided by the BS, $M \in \{1, \frac{1}{2}, 2\}$, and $$N_{slot}^{frame,\mu}$$

denotes a number of slots per frame for SCS configuration $\mu$.

Example 4 is the method of Example 2, wherein the slot index $n_0$ is determined by the UE as $$n_0 = (O*2^\mu + \lfloor k*M \rfloor) \bmod N_{slot}^{frame,\mu}, k = i + N*\lfloor i/S \rfloor,$$

wherein i is an index for a synchronization signal block (SSB) associated with the Type0-PDCCH CSS set, N is the number of consecutive slots that are reserved for uplink transmission after S consecutive SSB slots, O and M are parameters provided by the BS, $M \in \{1, \frac{1}{2}, 2\}$, and $$N_{slot}^{frame,\mu}$$

denotes a number of slots per frame for SCS configuration $\mu$.

Example 5 is the method of Example 4, wherein (S,N)= (8,2) for both 480 kHz SCS and 960 kHz SCS.

Example 6 is the method of Example 4, wherein (S,N)= (8,2) for 480 kHz SCS and (S,N)=(16, 4) for 960 kHz SCS.

Example 7 is the method of Example 4, wherein (S,N)= (32,8) for 480 kHz SCS in a case that a maximum number of candidates SSB blocks is 128 for 480 kHz SCS.

Example 8 is the method of Example 4, wherein the determined $n_0$ only applies to a Type0-PDCCH CSS configuration with O=0 and M=½.

Example 9 is the method of any of Examples 3-8, wherein the value of O and M are provided by the BS in a master information block (MIB).

Example 10 is the method of Example 1, wherein the monitoring comprises: monitoring the PDCCHs in the Type0-PDCCH CSS set over two consecutive slots $n_0$ and $n_0+1$ with a reference SCS; or monitoring the PDCCHs in the Type0-PDCCH CSS set over one slot $n_0$ with the reference SCS.

Example 11 is the method of Example 10, wherein the reference SCS is predefined as 120 kHz SCS.

Example 12 is the method of Example 10, wherein the reference SCS is provided by the BS by selecting one from 120 kHz SCS and 240 kHz SCS.

Example 13 is the method of Example 12, wherein a reserved bit field, R, in a master information block (MIB) is used by the BS to indicate the reference SCS.

Example 14 is the method of Example 12, wherein a 1-bit reference SCS information, b(0), is used by the BS to indicate the reference SCS by selection of a scrambling sequence, $w=[w_0, w_1, \ldots, w_{23}]$, to scramble cyclic redundancy check (CRC) bits of a physical broadcast channel (PBCH).

Example 15 is the method of Example 14, wherein $b(0)=0$ and $w=[0,0, \ldots 0]$ indicate that the 120 kHz SCS is used as the reference SCS.

Example 16 is the method of Example 14, wherein $b(0)=1$ and $w=[1,1, \ldots 1]$ indicate that the 240 kHz SCS is used as the reference SCS.

Example 17 is the method of any of Examples 10-16, wherein the slot index $n_0$ is determined by the UE as $$n_0 = \left( O * 2^\mu + \lfloor i * M \rfloor * 2^{(\mu - ref)} \right) \bmod N_{slot}^{frame,\mu},$$

wherein i is an index for a synchronization signal block (SSB) associated with the Type0-PDCCH CSS set, O and M are parameters provided by the BS, $M \in \{1, \frac{1}{2}, 2\}$, ref is an index for the reference SCS, and $$N_{slot}^{frame,\mu}$$

denotes a number of slots per frame for SCS configuration $\mu$.

Example 18 is the method of any of Example 10-16, wherein the slot index $n_0$ is determined by the UE as $$n_0 = \left( O * 2^\mu + \lfloor k * M \rfloor * 2^{(\mu - ref)} \right) \bmod N_{slot}^{frame,\mu}, \quad k = i + N * \lfloor i/S \rfloor,$$

wherein i is an index for a synchronization signal block (SSB) associated with the Type0-PDCCH CSS set, N is the number of consecutive slots that are reserved for uplink transmission after S consecutive SSB slots, O and M are parameters provided by the BS, $M \in \{1, 1/2, 2\}$, ref is an index for the reference SCS, and $$N_{slot}^{frame,\mu}$$

denotes a number of slots per frame for SCS configuration $\mu$.

Example 19 is the method of Example 17 or 18, wherein $\mu=5$ for 480 kHz SCS, $\mu=6$ for 960 kHz SCS, and ref=3 in a case that 120 kHz SCS is used as the reference SCS.

Example 20 is the method of any of Examples 1-19, wherein whether to monitor the PDCCHs in the Type0-CSS set over one or two consecutive slots is indicated by the BS using a PDCCH or MIB payload.

Example 21 is the method of Example 1, wherein the first group of SS sets includes Type1-PDCCH CSS with dedicated radio resource control (RRC) configuration, Type3-PDCCH CSS, and UE specific SS (USS), and the second group of SS sets includes Type0-PDCCH CSS, Type2-PDCCH CSS and Type1-PDCCH CSS without dedicated RRC configuration.

Example 22 is the method of Example 21, wherein the report of the UE capability comprises a number, $Y_{G1}$, of consecutive slots for the first group of SS sets within a slot group of a supported size X, and a number, $Y_{G2}$, of consecutive slots for the second group of SS sets within a slot group of the supported size X.

Example 23 is the method of Example 22, wherein $Y_{G1} \in \{1,2\}$ and $Y_{G2} \in \{1,2\}$ are supported by the UE for SCS configuration $\mu=5$ or 6.

Example 24 is the method of Example 22, wherein X=4 and X=8 are mandatorily supported by the UE for 480 kHz and 960 kHz SCS, respectively.

Example 25 is the method of Example 24, wherein X=2 for 480 kHz SCS and X=4 for 960 kHz are configured by the BS as part of the search space configurations on a per UE basis.

Example 26 is the method of Example 25, wherein the report of the UE capability comprises at least one of following configurations:

for 480 kHz SCS:

i) $X = 4$ and $\langle Y_{G1}, Y_{G2} \rangle = \langle 2, 2 \rangle$;

ii) $X = 4$ and $\langle Y_{G1}, Y_{G2} \rangle = \langle 1, 1 \rangle$ or $\langle 1, 2 \rangle$; and iii) $X = 2$ and $\langle Y_{G1}, Y_{G2} \rangle = \langle 1, 1 \rangle$ or $\langle 1, 2 \rangle$;

for 960 kHz SCS:

1) $X = 8$ and $\langle Y_{G1}, Y_{G2} \rangle = \langle 4, 2 \rangle$;

2) $X = 8$ and $\langle Y_{G1}, Y_{G2} \rangle = \langle 2, 2 \rangle$;

3) $X = 8$ and $\langle Y_{G1}, Y_{G2} \rangle = \langle 1, 1 \rangle$ or $\langle 1, 2 \rangle$;

4) $X = 4$ and $\langle Y_{G1}, Y_{G2} \rangle = \langle 2, 2 \rangle$; and

5) $X = 4$ and $\langle Y_{G1}, Y_{G2} \rangle = \langle 1, 1 \rangle$ or $\langle 1, 2 \rangle$.

Example 27 is the method of Example 26, wherein for 480 kHz SCS, configuration ii) is mandatory to be supported by the UE and configurations i) and iii) are selectively and optionally reported by the UE depending on UE capability.

Example 28 is the method of Example 26, wherein for 960 kHz SCS, configuration 3) is mandatory to be supported by the UE and at least one of configuration 1), configuration 2), configuration 4) or configuration 5) is selectively and optionally reported by the UE depending on UE capability.

Example 29 is the method of any of Examples 22-28, wherein the report of the UE capability further comprises at least one combination of supported $\{X, \mu\}$ for the BS to determine a limit, $\langle M,C \rangle$, of number of blind decoding (BD)/control channel elements (CCEs) for each supported SCS configuration $\mu$, wherein M denotes a maximum number of monitored PDCCH candidates per slot and per serving cell and C denotes a maximum number of non-overlapped CCEs per slot and per serving cell.

Example 30 is the method of Example 29, wherein for 480 kHz SCS, the limit of BD/CCE number is predefined as $\langle M=12, C=18 \rangle$ for X=2 and $\langle M=20, C=32 \rangle$ for X=4.

Example 31 is the method of Example 29, wherein the report of the UE capability comprises support of a plurality of combinations of $\{X, \mu\}$ such that the BS is to determine, as the limit of BD/CCE number, a maximum value of respective limits of BD/CCE number of valid ones of the plurality of combinations.

Example 32 is the method of Example 29, wherein a value of X used for determination of the limit of BD/CCE number is configured by the BS through a dedicated radio resource control (RRC) signaling on a per UE or per UE per component carrier (CC) basis for a give SCS configuration μ.

Example 33 is the method of Example 29, wherein the limit of BD/CCE number is determined by the BS based on the number of groups of consecutive slots in the larger slot group that is supported based on the UE capability report.

Example 34 is the method of Example 33, wherein in a case that there is one group of consecutive slots in a slot group of a size X=4 for 480 kHz SCS or X=8 for 960 kHz SCS, the limit of BD/CCE number is determined as a limit of BD/CCE number for X=4 for 480 kHz SCS or a limit of BD/CCE number for X=8 for 960 kHz SCS, respectively.

Example 35 is the method of Example 33, wherein in a case that there are two groups of consecutive slots in a slot group of a size X=4 for 480 kHz SCS or X=8 for 960 kHz SCS, the limit of BD/CCE number is determined as a limit of BD/CCE number for X=2 for 480 kHz SCS or a limit of BD/CCE number for X=4 for 960 kHz SCS, respectively.

Example 36 is the method of Example 21, wherein the MO shifting operation comprises shifting MOs for the first group of SS sets by k slots in time in response to a determination that the second group of SS sets is updated due to a quasi co-located (QCLed) synchronization signal block (SSB) update process after a beam failure recovery procedure, wherein k denotes an offset value for the shifting.

Example 37 is the method of Example 36, wherein after the beam failure recovery procedure for control resource set (CORESET) 0, the offset value k is determined by the UE based on an index, $$n_0^s,$$

for a source SSB of the QCLed SSB update process and an index, $$n_0^t,$$

for a target SSB of the QCLed SSB update process.

Example 38 is the method of Example 37, wherein the offset value k is determined by the UE as $$k = \mathrm{mod}(n_0^t, X) - \mathrm{mod}(n_0^s, X), \text{ if } n_0^s < n_0^t$$

$$k = X - (\mathrm{mod}(n_0^s, X) - \mathrm{mod}(n_0^t, X)), \text{ if } n_0^s > n_0^t.$$

Example 39 is the method of Example 37, wherein the offset value k is determined by the UE as $$k = n_0^t - n_0^s.$$

Example 40 is the method of Example 37, wherein the MO shifting operation further comprises:

updating, by the UE, CORESETs except CORESET0 that has been configured with the source SSB as QCL source to use the target SSB after a predefined processing time from a last symbol of a first PDCCH reception in an SS set provided by a parameter recoverySearchSpaceId where the UE detects a downlink control information (DCI) format with cyclic redundancy check (CRC) scrambled by a cell radio network temporary identifier (C-RNTI) or modulation coding scheme cell radio network temporary identifier (MCS-C-RNTI).

Example 41 is the method of Example 40, wherein the MO shifting operation further comprises:

feeding back, by the UE, a hybrid automatic repeat request acknowledgement (HARQ-ACK) for the detected DCI format with CRC scrambled by the C-RNTI or MCS-C-RNTI in the SS set provided by recoverySearchSpaceId.

Example 42 is a method performed by a base station (BS), the method comprising:

performing at least one of:

transmitting, to a user equipment (UE), configuration information for the UE to monitor physical downlink control channels (PDCCHs) in a Type0-PDCCH common search space (CSS) set over one or two consecutive slots, starting from a slot index $n_0$, with a 480 kHz or 960 kHz subcarrier spacing (SCS);

receiving, from the UE, a report of a UE capability related to search space configurations for multi-slot PDCCH monitoring; or updating a second group of SS sets and performing a monitoring occasion (MO) shifting operation for a first group of search space (SS) sets based on the updated second group of SS sets.

Example 43 is the method of Example 42, wherein transmitting of the PDCCHs by the BS comprises: transmitting the PDCCHs in the Type0-PDCCH CSS set over one or two of two consecutive slots $n_0$ and $n_0+1$; or transmitting the PDCCHs in the Type0-PDCCH CSS set over one slot $n_0$.

Example 44 is the method of Example 43, wherein the slot index $n_0$ is determined by the BS as $$n_0 = (O * 2^\mu + \lfloor i * M \rfloor) \mathrm{mod} N_{slot}^{frame,\mu},$$

wherein i is an index for a synchronization signal block (SSB) associated with the Type0-PDCCH CSS set, O and M are parameters provided by the BS, $M \in \{1, \frac{1}{2}, 2\}$, and $$N_{slot}^{frame,\mu}$$

denotes a number of slots per frame for SCS configuration μ.

Example 45 is the method of Example 43, wherein the slot index $n_0$ is determined by the BS as $$n_0 = (O * 2^\mu + \lfloor k * M \rfloor) \mathrm{mod} N_{slot}^{frame,\mu}, k = i + N * \lfloor i/S \rfloor,$$

wherein i is an index for a synchronization signal block (SSB) associated with the Type0-PDCCH CSS set, N is the number of consecutive slots that are reserved for uplink transmission after S consecutive SSB slots, O and M are parameters provided by the BS, $M \in \{1, \frac{1}{2}, 2\}$, and $$N_{slot}^{frame,\mu}$$

denotes a number of slots per frame for SCS configuration μ.

Example 46 is the method of Example 42, wherein transmitting of the PDCCHs by the BS comprises: transmitting the PDCCHs in the Type0-PDCCH CSS set over one or two of two consecutive slots $n_0$ and $n_0+1$ with a reference SCS; or transmitting the PDCCHs in the Type0-PDCCH CSS set over one slot $n_0$ with the reference SCS.

Example 47 is the method of Example 46, wherein the reference SCS is predefined as 120 kHz SCS.

Example 48 is the method of Example 46, wherein the reference SCS is provided by the BS by selecting one from 120 kHz SCS and 240 kHz SCS.

Example 49 is the method of any of Examples 46-48, wherein the slot index $n_0$ is determined by the BS as $$n_0 = \left(O * 2^{\mu} + \lfloor i * M \rfloor * 2^{(\mu - ref)}\right) \bmod N_{slot}^{frame,\mu},$$

wherein i is an index for a synchronization signal block (SSB) associated with the Type0-PDCCH CSS set, O and M are parameters provided by the BS, $M \in \{1, \frac{1}{2}, 2\}$, ref is an index for the reference SCS, and $$N_{slot}^{frame,\mu}$$

denotes a number of slots per frame for SCS configuration μ.

Example 50 is the method of any of Example 46-48, wherein the slot index $n_0$ is determined by the BS as $$n_0 = \left(O * 2^{\mu} + \lfloor k * M \rfloor * 2^{(\mu - ref)}\right) \bmod N_{slot}^{frame,\mu}, \ k = i + N * \lfloor i/S \rfloor,$$

wherein i is an index for a synchronization signal block (SSB) associated with the Type0-PDCCH CSS set, N is the number of consecutive slots that are reserved for uplink transmission after S consecutive SSB slots, O and M are parameters provided by the BS, $M \in \{1, \frac{1}{2}, 2\}$, ref is an index for the reference SCS, and $$N_{slot}^{frame,\mu}$$

denotes a number of slots per frame for SCS configuration μ.

Example 51 is the method of Example 42, wherein the first group of SS sets includes Type1-PDCCH CSS with dedicated radio resource control (RRC) configuration, Type3-PDCCH CSS, and UE specific SS (USS), and the second group of SS sets includes Type0-PDCCH CSS, Type2-PDCCH CSS and Type1-PDCCH CSS without dedicated RRC configuration.

Example 52 is the method of Example 51, wherein the report of the UE capability comprises a number, $Y_{G1}$, of consecutive slots for the first group of SS sets within a slot group of a supported size X, and a number, $Y_{G2}$, of consecutive slots for the second group of SS sets within a slot group of the supported size X.

Example 53 is the method of any of Examples 52, wherein the report of the UE capability further comprises at least one combination of supported {X, μ} for the BS to determine a limit, $\langle M,C \rangle$, of number of blind decoding (BD)/control channel elements (CCEs) for each supported SCS configuration μ, wherein M denotes a maximum number of monitored PDCCH candidates per slot and per serving cell and C denotes a maximum number of non-overlapped CCEs per slot and per serving cell.

Example 54 is the method of Example 53, wherein the BS determines the limit of BD/CCE number including a maximum value of respective limits of BD/CCE number of valid ones of the plurality of combinations based on a plurality of combinations of {X, μ} in the report of the UE.

Example 55 is the method of Example 53, wherein a value of X used for determination of the limit of BD/CCE number is configured by the BS through a dedicated radio resource control (RRC) signaling on a per UE or per UE per component carrier (CC) basis for a give SCS configuration μ.

Example 56 is the method of Example 53, wherein the limit of BD/CCE number is determined by the BS based on a number of groups of consecutive slots in the larger slot group that is supported based on the UE capability report.

Example 57 is the method of Example 51, wherein the MO shifting operation comprises shifting MOs for the first group of SS sets by k slots in time in response to a determination that the second group of SS sets is updated due to a quasi co-located (QCLed) synchronization signal block (SSB) update process after a beam failure recovery procedure, wherein k denotes an offset value for the shifting.

Example 58 is the method of Example 57, wherein after the beam failure recovery procedure for control resource set (CORESET) 0, the offset value k is determined by the BS based on an index $$n_0^s,$$

for a source SSB of the QCLed SSB update process and an index, $$n_0^t,$$

for a target SSB of the QCLed SSB update process.

Example 59 is the method of Example 58, wherein the offset value k is determined by the BS as $$k = \bmod(n_0^t, X) - \bmod(n_0^s, X), \text{ if } n_0^s < n_0^t$$
$$k = X - (\bmod(n_0^s, X) - \bmod(n_0^t, X)), \text{ if } n_0^s > n_0^t.$$

Example 60 is the method of Example 58, wherein the offset value k is determined by the BS as $$k = n_0^t - n_0^s.$$

Example 61 is an apparatus for a user equipment (UE), the apparatus comprising one or more processors configured to perform the method of any of Examples 1 to 41.

Example 62 is an apparatus for a base station (BS), the apparatus comprising one or more processors configured to perform the method of any of Examples 42 to 60.

Example 63 is an apparatus for a communication device, comprising means for performing the method of any of Examples 1 to 60.

Example 64 is a computer readable medium having computer programs stored thereon which, when executed by an apparatus having one or more processors, cause the apparatus to perform the method of any of Examples 1 to 60.

Example 65 is a computer program product comprising computer programs which, when executed by an apparatus having one or more processors, cause the apparatus to perform the method of any of Examples 1 to 60.

Any of the above described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. One or more non-transitory, computer-readable media having instructions that, when executed, cause processor circuitry to:

determine one more values based on a master information block (MIB);

determine a slot index $n_0$ based on the one or more values;

determine, based on the slot index $n_0$, two slots with a 480 kilohertz (kHz) or 960 kHz subcarrier spacing (SCS); and monitor for a physical downlink control channel (PDCCH) in a Type0-PDCCH common search space (CSS) set over the two slots, wherein the one or more values include a first value O and a second value M, and the slot index $n_0$ is determined as $$n_0 = (O*2^\mu + \lfloor k*M \rfloor) \bmod N_{slot}^{frame,\mu}, k = i + N * \lfloor i/S \rfloor.$$

wherein i is an index for a synchronization signal block (SSB) associated with the Type0-PDCCH CSS set, N is a number of consecutive slots that are reserved for uplink transmission after S consecutive SSB slots, $M \in \{1,1/2,2\}$, and $$N_{slot}^{frame,\mu}$$

denotes a number of slots per frame for SCS configuration $\mu$.

2. The one or more non-transitory, computer-readable media of claim 1, wherein the two slots are two consecutive slots, the slot index $n_0$ corresponds to a first slot of the two consecutive slots.

3. The one or more non-transitory, computer-readable media of claim 1, wherein (S, N)=(8, 2) for both 480 kHz SCS and 960 kHz SCS.

4. The one or more non-transitory, computer-readable media of claim 1, wherein (S, N)=(8, 2) for 480 kHz SCS and (S, N)=(16, 4) for 960 kHz SCS.

5. The one or more non-transitory, computer-readable media of claim 1, wherein (S, N)=(32, 8) for 480 kHz SCS in a case in which a maximum number of candidates SSB blocks is 128 for 480 kHz SCS.

6. The one or more non-transitory, computer-readable media of claim 1, wherein O=0 and M=1/2.

7. The one or more non-transitory, computer-readable media of claim 1, wherein the slot index $n_0$ is a first slot index $n_0$ that corresponds to a first reference slot of two consecutive reference slots with a reference SCS, a second slot index $n_1$ corresponds to a second reference slot of the two consecutive reference slots, and the instructions, when executed, further cause the processor circuitry to:

determine a first slot of the two slots with the 480 kHz or 960 kHz SCS based on the first reference slot; and determine a second slot of the two slots with the 480 kHz or 960 kHz SCS based on the second reference slot.

8. The one or more non-transitory, computer-readable media of claim 7, wherein the reference SCS is a 120 kHz SCS.

9. A method comprising:

determining one more values based on a master information block (MIB);

determining a slot index $n_0$ based on the one or more values;

determining, based on the slot index $n_0$, two slots with a 480 kilohertz (kHz) or 960 kHz subcarrier spacing (SCS); and monitoring for a physical downlink control channel (PDCCH) in a Type0-PDCCH common search space (CSS) set over the two slots, wherein the one or more values include a first value O and a second value M and the first slot index $n_0$ is determined as:

$$n_0 = \left(O*2^\mu + \lfloor k*M \rfloor * 2^{(\mu-ref)}\right) \bmod N_{slot}^{frame,\mu}, k = i + N * \lfloor i/S \rfloor.$$

wherein i is an index for a synchronization signal block (SSB) associated with the Type0-PDCCH CSS set, N is a number of consecutive slots that are reserved for uplink transmission after S consecutive SSB slots, $M \in \{1, 1/2, 2\}$, ref is an index for a reference SCS, and $$N_{slot}^{frame,\mu}$$

denotes a number of slots per frame for SCS configuration $\mu$.

10. The method of claim 9, wherein the two slots are two consecutive slots.

11. The method of claim 9, wherein the slot index $n_0$ is a first slot index $n_0$ that corresponds to a first reference slot of two consecutive reference slots with the reference SCS, a second slot index $n_1$ corresponds to a second reference slot of the two consecutive reference slots, and the method further comprises:

determining a first slot of the two slots with the 480 kHz or 960 kHz SCS based on the first reference slot; and determining a second slot of the two slots with the 480 kHz or 960 kHz SCS based on the second reference slot.

12. The method of claim 11, wherein the reference SCS is a 120 kHz SCS.

13. The method of claim 9, wherein $\mu=5$ for 480 kHz SCS, $\mu=6$ for 960 kHz SCS, the reference SCS is 120 kHz SCS, and ref=3.

14. A method comprising:

outputting a master information block (MIB) to indicate one more values to serve as a basis for determining a slot index $n_0$; and outputting, for transmission, a physical downlink control channel (PDCCH) in a Type0-PDCCH common search space (CSS) set that includes two slots determined based on the slot index $n_0$, wherein the two slots have a 480 kilohertz (kHz) or 960 kHz subcarrier spacing (SCS), wherein the one or more values include a first value O and a second value M, and the slot index $n_0$ is determined as $$n_0 = (O * 2^{\mu} + \lfloor k * M \rfloor) \bmod N_{slot}^{frame,\mu}, \quad k = i + N * \lfloor i/S \rfloor.$$

wherein i is an index for a synchronization signal block (SSB) associated with the Type0-PDCCH CSS set, N is a number of consecutive slots that are reserved for uplink transmission after S consecutive SSB slots, $M \in \{1, 1/2, 2\}$, and $$N_{slot}^{frame,\mu}$$

denotes a number of slots per frame for SCS configuration $\mu$.

15. The method of claim 14, wherein (S, N)=(8, 2) for both 480 kHz SCS and 960 kHz SCS.

16. The method of claim 14, wherein (S, N)=(8, 2) for 480 kHz SCS and (S, N)=(16, 4) for 960 KHz SCS.

17. The method of claim 14, wherein (S, N)=(32, 8) for 480 kHz SCS in a case in which a maximum number of candidates SSB blocks is 128 for 480 kHz SCS.

18. The method of claim 14, wherein O=0 and M=1/2.

* * * * *